United States Patent
Wang et al.

(10) Patent No.: US 12,464,029 B2
(45) Date of Patent: Nov. 4, 2025

(54) COMMUNICATIONS METHOD AND APPARATUS

(71) Applicant: Huawei Technologies Co., Ltd., Shenzhen (CN)

(72) Inventors: Yong Wang, Shenzhen (CN); Jing Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 17/994,516

(22) Filed: Nov. 28, 2022

(65) Prior Publication Data
US 2023/0091113 A1 Mar. 23, 2023

Related U.S. Application Data

(63) Continuation of application No. PCT/CN2020/093542, filed on May 29, 2020.

(51) Int. Cl.
*H04M 1/66* (2006.01)
*H04L 9/40* (2022.01)
*H04W 12/03* (2021.01)
*H04W 12/041* (2021.01)
*H04W 12/106* (2021.01)

(52) U.S. Cl.
CPC .......... *H04L 63/205* (2013.01); *H04W 12/03* (2021.01); *H04W 12/041* (2021.01); *H04W 12/106* (2021.01)

(58) Field of Classification Search
CPC .............. H04L 63/205; H04W 12/041; H04W 12/106; H04W 12/03; H04W 12/06; H04W 12/069; H04W 12/12
See application file for complete search history.

(56) References Cited

U.S. PATENT DOCUMENTS

| | | | |
|---|---|---|---|
| 7,681,246 B1 * | 3/2010 | Chen | G06F 21/73 |
| | | | 713/176 |
| 11,418,950 B1 * | 8/2022 | Sreenivas Hariharan | ................... |
| | | | H04L 9/14 |
| 2012/0042168 A1 | 2/2012 | Yuan et al. | |

(Continued)

FOREIGN PATENT DOCUMENTS

| | | |
|---|---|---|
| CN | 101645877 A | 2/2010 |
| CN | 106899562 A | 6/2017 |

(Continued)

OTHER PUBLICATIONS

3GPP A Global Initiative, "3rd Generation Partnership Project; Technical Specification Group Services and System Aspects; Security architecture and procedures for 5G system (Release 15)", 3GPP TS 33.501 V15.8.0, Mar. 27, 2020, 191 pages.

*Primary Examiner* — Shantell L Heiber
(74) *Attorney, Agent, or Firm* — Conley Rose. P.C.

(57) ABSTRACT

A communications method includes receiving, from a second node, first algorithm negotiation request information used to indicate one or more algorithms and one or more key derivation functions, determining at least one first algorithm in the one or more algorithms and at least one first key derivation function in the one or more key derivation functions, and sending, to the second node, first information used to indicate the at least one first algorithm and the at least one first key derivation function.

32 Claims, 9 Drawing Sheets

(56) References Cited

U.S. PATENT DOCUMENTS

| | | | | |
|---|---|---|---|---|
| 2013/0310006 A1* | 11/2013 | Chen | ............... | H04W 12/04 |
| | | | | 455/411 |
| 2016/0269392 A1* | 9/2016 | Arumugam | ........... | H04L 63/083 |
| 2018/0034635 A1* | 2/2018 | Zhang | ................ | H04W 12/03 |
| 2018/0167807 A1* | 6/2018 | Ying | ................ | H04L 9/0838 |
| 2018/0332471 A1* | 11/2018 | Zhu | ................ | H04L 63/061 |
| 2019/0082325 A1 | 3/2019 | Muhanna et al. | | |
| 2020/0059780 A1* | 2/2020 | Hess | ................ | H04W 12/041 |
| 2020/0221297 A1 | 7/2020 | Hu et al. | | |
| 2021/0352469 A1* | 11/2021 | Ben Henda | ........... | H04L 63/205 |

FOREIGN PATENT DOCUMENTS

| | | |
|---|---|---|
| CN | 109561427 A | 4/2019 |
| CN | 110149630 A | 8/2019 |
| CN | 109905348 B | 10/2020 |
| CN | 109560919 B | 2/2021 |
| EP | 2173055 A1 | 4/2010 |
| EP | 2416521 A1 | 2/2012 |
| JP | 2008066834 A | 3/2008 |

\* cited by examiner

COMMUNICATIONS METHOD AND APPARATUS

CROSS-REFERENCE TO RELATED APPLICATIONS

This is a continuation of International Patent Application No. PCT/CN2020/093542 filed on May 29, 2020, the disclosure of which is hereby incorporated by reference in its entirety.

TECHNICAL FIELD

Embodiments of this application relate to the wireless communications field, and in particular, to a communications method and apparatus. The method and apparatus may be applied to the short-range communications field, for example, a cockpit domain, and are applicable to scenarios such as autonomous driving or intelligent driving.

BACKGROUND

During data transmission, to ensure data transmission security, a sender encrypts data by using an algorithm and sends encrypted data to a receiver. After receiving the encrypted data, the receiver decrypts the encrypted data by using the algorithm to obtain the data. To enable the receiver to correctly decrypt the data sent by the sender, the receiver needs to use the same algorithm as the sender to decrypt the encrypted data such as to ensure normal communication.

However, in the conventional technology, there are many types of algorithms related to communication encryption. Based on settings of capabilities of the sender and the receiver and requirements of scenarios, the sender and the receiver may support many types of algorithms. Therefore, how to enable the sender and the receiver to accurately and efficiently perform processing such as encryption or decryption on data by using a same algorithm is crucial to communication efficiency and performance.

SUMMARY

Embodiments of this application provide a communications method and apparatus such that a sender and a receiver can accurately and efficiently perform processing related to encryption or decryption on communication information.

To achieve the foregoing objective, the following technical solutions are used in the embodiments of this application.

According to a first aspect, an embodiment of this application provides a communications method. The method is applied to a first node, and the method includes receiving first algorithm negotiation request information from a second node, where the first algorithm negotiation request information is used to indicate one or more algorithms and one or more key derivation functions (KDFs); determining at least one first algorithm in the one or more algorithms and at least one first KDF in the one or more KDFs; and sending first information to the second node, where the first information is used to indicate the at least one first algorithm and the at least one first KDF.

According to the method provided in the first aspect, the first algorithm negotiation request information used to indicate the one or more algorithms and the one or more KDFs may be received from the second node, the at least one first algorithm and the at least one first KDF may be determined based on the first algorithm negotiation request information, and the first information used to indicate the at least one first algorithm and the at least one first KDF may be sent to the second node. In this way, the first node can negotiate with the second node for an algorithm and a KDF such that the first node and the second node accurately and efficiently perform processing related to encryption or decryption on communication information. An example in which the first node sends information to the second node is used. The first node may encrypt the information according to the negotiated algorithm and KDF, and send encrypted information to the second node. After receiving the encrypted information, the second node may decrypt the encrypted information according to the negotiated algorithm and KDF. This improves security of communication between the first node and the second node.

With reference to the first aspect, in a possible implementation, the one or more algorithms include an encryption algorithm, and/or an integrity protection algorithm, and/or an authenticated encryption algorithm. Based on the foregoing method, the first node and the second node may communicate with each other by using a plurality of algorithms such as the encryption algorithm, the integrity protection algorithm, or the authenticated encryption algorithm. This improves diversity of algorithms used for communication between the first node and the second node.

With reference to the first aspect and the possible implementations of the first aspect, in a possible implementation, integrity protection is performed on the first information by using the at least one first algorithm. Based on the foregoing method, the first node may perform integrity protection on the first information by using the at least one first algorithm. This improves security of communication between the first node and the second node.

With reference to the first aspect and the possible implementations of the first aspect, in a possible implementation, the first information includes second information and a first message authentication code (MAC), the second information is used to indicate the at least one first algorithm and the at least one first KDF, and the first MAC is obtained by performing integrity protection on the second information. Based on the foregoing method, the first node may send the second information and the first MAC to the second node, and perform integrity protection on the second information by using the first MAC. This can improve security of communication between the first node and the second node.

With reference to the first aspect and the possible implementations of the first aspect, in a possible implementation, the at least one first algorithm includes an integrity protection algorithm, and the first MAC is obtained by performing integrity protection on the second information by using the integrity protection algorithm; or the at least one first algorithm includes an authenticated encryption algorithm, and the first MAC is obtained by performing integrity protection on the second information by using the authenticated encryption algorithm. Based on the foregoing method, the first node may perform integrity protection on the second information by using a plurality of algorithms. This improves flexibility and diversity of integrity protection performed by the first node on information between the first node and the second node.

With reference to the first aspect and the possible implementations of the first aspect, in a possible implementation, the second information further includes a first fresh parameter and first verification information, the first fresh parameter is a parameter related to time validity of the first information, and the first verification information is obtained based on the first algorithm negotiation request information, a preset shared key, the first fresh parameter, and the first KDF. Based on the foregoing method, the first node may further perform integrity protection on the first algorithm negotiation request information based on the first verification information. This improves security of communication between the first node and the second node.

With reference to the first aspect and the possible implementations of the first aspect, in a possible implementation, the first information includes encrypted information, second communication information, and a second MAC; the encrypted information is obtained by encrypting first communication information, the first communication information does not indicate at least one of the at least one first algorithm or the at least one first KDF, and the second communication information is used to indicate at least one of the at least one first algorithm or the at least one first KDF; and the second MAC is obtained by performing integrity protection on the encrypted information and the second communication information. Based on the foregoing method, the first node may encrypt the first communication information to obtain the encrypted information, and perform integrity protection on the encrypted information and the second communication information by using the second MAC. This can improve security of communication between the first node and the second node.

With reference to the first aspect and the possible implementations of the first aspect, in a possible implementation, the at least one first algorithm includes an encryption algorithm and an integrity protection algorithm; the encrypted information is obtained by encrypting the first communication information by using the encryption algorithm; and the second MAC is obtained by performing integrity protection on the encrypted information and the second communication information by using the integrity protection algorithm. Based on the foregoing method, the first node may further encrypt the first communication information by using the encryption algorithm, and perform integrity protection on the encrypted information and the second communication information by using the integrity protection algorithm. This improves security of communication between the first node and the second node.

With reference to the first aspect and the possible implementations of the first aspect, in a possible implementation, the at least one first algorithm includes an authenticated encryption algorithm; the encrypted information is obtained by encrypting the first communication information by using the authenticated encryption algorithm; and the second MAC is obtained by performing integrity protection on the encrypted information and the second communication information by using the authenticated encryption algorithm. Based on the foregoing method, the first node may further encrypt the first communication information by using the authenticated encryption algorithm, and perform integrity protection on the encrypted information and the second communication information by using the authenticated encryption algorithm. This improves security of communication between the first node and the second node.

With reference to the first aspect and the possible implementations of the first aspect, in a possible implementation, the at least one first algorithm is an algorithm that is supported by the first node and that has a highest priority in the one or more algorithms, and the at least one first KDF is a KDF that is supported by the first node and that has a highest priority in the one or more KDFs. Based on the foregoing method, because a priority of an algorithm is obtained based on security of the algorithm, and a higher priority of a used algorithm indicates higher communication security, the first node communicates with the second node by using the algorithm that is supported by the first node and that has the highest priority in the one or more algorithms and the KDF that is supported by the first node and that has the highest priority in the one or more KDFs. This can improve security of communication between the first node and the second node.

With reference to the first aspect and the possible implementations of the first aspect, in a possible implementation, the at least one first algorithm corresponds to one or more algorithm types, and the algorithm type corresponding to the at least one first algorithm is an algorithm type that is supported by the first node and that has a highest priority in one or more algorithm types of the one or more algorithms. Based on the foregoing method, the first node may determine an algorithm type having a highest priority in algorithm types supported by both the first node and the second node, so that the first node determines the at least one first algorithm corresponding to the algorithm type having the highest priority.

With reference to the first aspect and the possible implementations of the first aspect, in a possible implementation, the at least one first algorithm corresponds to one algorithm type, the algorithm type may correspond to a plurality of algorithms having different priorities, and the first algorithm is an algorithm that is supported by the first node and that has a highest priority in the algorithms corresponding to the algorithm type. Based on the foregoing method, when the at least one first algorithm corresponds to one algorithm type, the first node may determine, as the first algorithm, an algorithm that is supported by the first node and that has a highest priority in the algorithm type corresponding to the first algorithm. Alternatively, if the algorithm type corresponds to only one algorithm, the first node determines that the first algorithm includes the algorithm. In this way, the first node may communicate with the second node by using an algorithm having a relatively high priority. Usually, a priority of an algorithm is related to security of the algorithm. Therefore, the first node and the second node communicate with each other by using the algorithm having a relatively high priority such that security of communication between the first node and the second node can be improved.

With reference to the first aspect and the possible implementations of the first aspect, in a possible implementation, the at least one first algorithm corresponds to a plurality of algorithm types, and priorities of the plurality of algorithm types are the same. Each algorithm type may correspond to one or more algorithms having different priorities, and the at least one first algorithm includes an algorithm that is supported by the first node and that has a highest priority in algorithms corresponding to each of the plurality of algorithm types. Alternatively, if an algorithm type corresponds to only one algorithm, the at least one first algorithm includes the algorithm corresponding to the algorithm type. Based on the foregoing method, when the at least one first algorithm corresponds to the plurality of algorithm types, the first node may determine, as the first algorithm, an algorithm that is supported by the first node and that has a highest priority in each algorithm type. In this way, the first node may communicate with the second node by using an algorithm having a relatively high priority. Usually, a priority of an algorithm is related to security of the algorithm. Therefore, the first node and the second node communicate with each other by using the algorithm having a relatively high priority, so that security of communication between the first node and the second node can be improved.

With reference to the first aspect and the possible implementations of the first aspect, in a possible implementation, the first algorithm negotiation request information further includes a second fresh parameter, the second fresh parameter is a parameter related to time validity of the first algorithm negotiation request information, and the method further includes receiving second verification information from the second node, where the second verification information is obtained based on the first information, the preset shared key, the second fresh parameter, and the first KDF; and verifying the second verification information based on the first information, the shared key, the second fresh parameter, and the first KDF. Based on the foregoing method, the first node may verify, based on the first information, the shared key, the second fresh parameter, and the first KDF, whether the first information received by the second node is modified, to improve security of communication between the first node and the second node.

With reference to the first aspect and the possible implementations of the first aspect, in a possible implementation, the method further includes receiving second algorithm negotiation request information from the second node, where the second algorithm negotiation request information is used to indicate one or more algorithms and one or more KDFs; and sending third information to the second node, where the third information is used to indicate that the one or more algorithms and the one or more KDFs indicated by the second algorithm negotiation request information are not supported or are not applicable. Based on the foregoing method, the first node may receive the second algorithm negotiation request information that is from the second node and that is used to indicate the one or more algorithms and the one or more KDFs, and send, to the second node, the third information used to indicate that the one or more algorithms and the one or more KDFs indicated by the second algorithm negotiation request information are not supported or are not applicable. In this way, the first node and the second node may negotiate an algorithm and a KDF by performing communication a plurality of times, to improve a success rate of negotiating the algorithm and the KDF by the first node and the second node.

With reference to the first aspect and the possible implementations of the first aspect, in a possible implementation, the one or more algorithms indicated by the second algorithm negotiation request information are different from the one or more algorithms indicated by the first algorithm negotiation request information; and the one or more KDFs indicated by the second algorithm negotiation request information are different from the one or more KDFs indicated by the first algorithm negotiation request information. Based on the foregoing method, the first node may obtain one or more algorithms and one or more KDFs that are indicated by the second node a plurality of times, so that the first node determines, based on the one or more obtained algorithms and the one or more obtained KDFs, an algorithm and a KDF that are used for communication with the second node. This improves a success rate of negotiating the algorithm and the KDF by the first node and the second node.

According to a second aspect, an embodiment of this application provides a communications method. The method is applied to a second node, and the method includes sending first algorithm negotiation request information to a first node, where the first algorithm negotiation request information is used to indicate one or more algorithms and one or more KDFs; and receiving first information from the first node, where the first information is used to indicate at least one first algorithm in the one or more algorithms and at least one first KDF in the one or more KDFs.

According to the method provided in the second aspect, the first algorithm negotiation request information used to indicate the one or more algorithms and the one or more KDFs may be sent to the first node, and the first information used to indicate the at least one first algorithm in the one or more algorithms and the at least one first KDF in the one or more KDFs may be received from the first node. In this way, the first node and the second node can negotiate an algorithm and a KDF, and communicate with each other by using the negotiated algorithm and KDF such that the first node and the second node accurately and efficiently perform processing related to encryption or decryption on communication information.

With reference to the second aspect, in a possible implementation, the one or more algorithms include an encryption algorithm, and/or an integrity protection algorithm, and/or an authenticated encryption algorithm. Based on the foregoing method, the first node and the second node may communicate with each other by using a plurality of algorithms such as the encryption algorithm, the integrity protection algorithm, or the authenticated encryption algorithm. This improves diversity of algorithms used for communication between the first node and the second node.

With reference to the second aspect and the possible implementations of the second aspect, in a possible implementation, integrity protection is performed on the first information by using the at least one first algorithm. Based on the foregoing method, the second node may verify integrity of the first information by using the at least one first algorithm. This improves security of communication between the first node and the second node.

With reference to the second aspect and the possible implementations of the second aspect, in a possible implementation, the first information includes second information and a first message authentication code MAC, the second information is used to indicate the at least one first algorithm and the at least one first KDF, and the first MAC is obtained by performing integrity protection on the second information. Based on the foregoing method, the second node may receive the second information and the first MAC from the first node, where integrity protection is performed on the second information by using the first MAC. This can improve security of communication between the first node and the second node.

With reference to the second aspect and the possible implementations of the second aspect, in a possible implementation, the at least one first algorithm includes an integrity protection algorithm, the first MAC is obtained by performing integrity protection on the second information by using the integrity protection algorithm, and the method further includes obtaining a third MAC based on the integrity protection algorithm and the second information, where the third MAC is used to verify integrity of the second information; or the at least one first algorithm includes an authenticated encryption algorithm, the first MAC is obtained by performing integrity protection on the second information by using the authenticated encryption algorithm, and the method further includes obtaining a third MAC based on the authenticated encryption algorithm and the second information, where the third MAC is used to verify integrity of the second information. Based on the foregoing method, the second node may verify the integrity of the second information according to a plurality of algorithms. This improves flexibility and diversity of the second node when the second node verifies integrity of information.

With reference to the second aspect and the possible implementations of the second aspect, in a possible implementation, the second information further includes a first fresh parameter and first verification information, the first fresh parameter is a parameter related to time validity of the first information, and the first verification information is obtained based on the first algorithm negotiation request information, a preset shared key, the first fresh parameter, and the first KDF. Based on the foregoing method, the second node may further verify integrity of the first algorithm negotiation request information by using the first verification information. This improves security of communication between the first node and the second node.

With reference to the second aspect and the possible implementations of the second aspect, in a possible implementation, the first information includes encrypted information, second communication information, and a second MAC; the encrypted information is obtained by encrypting first communication information, the first communication information does not indicate at least one of the at least one first algorithm or the at least one first KDF, and the second communication information is used to indicate at least one of the at least one first algorithm or the at least one first KDF; and the second MAC is obtained by performing integrity protection on the encrypted information and the second communication information. Based on the foregoing method, the second node may receive the encrypted information, the second communication information, and the second MAC from the first node, so that the second node verifies integrity of the encrypted information and the second communication information by using the second MAC. This can improve security of communication between the first node and the second node.

With reference to the second aspect and the possible implementations of the second aspect, in a possible implementation, the at least one first algorithm includes an encryption algorithm and an integrity protection algorithm; the encrypted information is obtained by encrypting the first communication information by using the encryption algorithm; the second MAC is obtained by performing integrity protection on the encrypted information and the second communication information by using the integrity protection algorithm; and the method further includes obtaining a fourth MAC based on the integrity protection algorithm, the encrypted information, and the second communication information; and decrypting the encrypted information by using the encryption algorithm if the fourth MAC is the same as the second MAC. Based on the foregoing method, the second node may further obtain the fourth MAC based on the integrity protection algorithm, the encrypted information, and the second communication information, and verify integrity of the encrypted information and the second communication information by using the fourth MAC. This improves security of communication between the first node and the second node.

With reference to the second aspect and the possible implementations of the second aspect, in a possible implementation, the at least one first algorithm includes an authenticated encryption algorithm; the encrypted information is obtained by encrypting the first communication information by using the authenticated encryption algorithm; the second MAC is obtained by performing integrity protection on the encrypted information and the second communication information by using the authenticated encryption algorithm; and the method further includes obtaining a fourth MAC based on the authenticated encryption algorithm, the encrypted information, and the second communication information; and decrypting the encrypted information by using the authenticated encryption algorithm if the fourth MAC is the same as the second MAC. Based on the foregoing method, the second node may further obtain the fourth MAC based on the authenticated encryption algorithm, the encrypted information, and the second communication information, and verify integrity of the encrypted information and the second communication information by using the fourth MAC. This improves security of communication between the first node and the second node.

With reference to the second aspect and the possible implementations of the second aspect, in a possible implementation, the at least one first algorithm is an algorithm that is supported by the first node and that has a highest priority in the one or more algorithms, and the at least one first KDF is a KDF that is supported by the first node and that has a highest priority in the one or more KDFs. Based on the foregoing method, because a priority of an algorithm is obtained based on security of the algorithm, and a higher priority of a used algorithm indicates higher communication security, the second node communicates with the first node by using the algorithm that is supported by the first node and that has the highest priority in the one or more algorithms and the KDF that is supported by the first node and that has the highest priority in the one or more KDFs. This can improve security of communication between the first node and the second node.

With reference to the second aspect and the possible implementations of the second aspect, in a possible implementation, the at least one first algorithm corresponds to one or more algorithm types, and the algorithm type corresponding to the at least one first algorithm is an algorithm type that is supported by the first node and that has a highest priority in one or more algorithm types of the one or more algorithms. Based on the foregoing method, the first node may determine an algorithm type having a highest priority in algorithm types supported by both the first node and the second node, so that the first node determines the at least one first algorithm corresponding to the algorithm type having the highest priority.

With reference to the second aspect and the possible implementations of the second aspect, in a possible implementation, the at least one first algorithm corresponds to one algorithm type, the algorithm type may correspond to a plurality of algorithms having different priorities, and the first algorithm is an algorithm that is supported by the first node and that has a highest priority in the algorithms corresponding to the algorithm type. Based on the foregoing method, when the at least one first algorithm corresponds to one algorithm type, the first node may determine, as the first algorithm, an algorithm that is supported by the first node and that has a highest priority in the algorithm type corresponding to the first algorithm. Alternatively, if the algorithm type corresponds to only one algorithm, the first node determines that the first algorithm includes the algorithm. In this way, the first node may communicate with the second node by using an algorithm having a relatively high priority. Usually, a priority of an algorithm is related to security of the algorithm. Therefore, the first node and the second node communicate with each other by using the algorithm having a relatively high priority, so that security of communication between the first node and the second node can be improved.

With reference to the second aspect and the possible implementations of the second aspect, in a possible implementation, the at least one first algorithm corresponds to a plurality of algorithm types, and priorities of the plurality of algorithm types are the same. Each algorithm type may correspond to a plurality of algorithms having different priorities, and the at least one first algorithm includes an algorithm that is supported by the first node and that has a highest priority in algorithms corresponding to each of the plurality of algorithm types. Alternatively, if an algorithm type corresponds to only one algorithm, the at least one first algorithm includes the algorithm corresponding to the algorithm type. Based on the foregoing method, when the at least one first algorithm corresponds to the plurality of algorithm types, the first node may determine, as the first algorithm, an algorithm that is supported by the first node and that has a highest priority in each algorithm type. In this way, the first node may communicate with the second node by using an algorithm having a relatively high priority. Usually, a priority of an algorithm is related to security of the algorithm. Therefore, the first node and the second node communicate with each other by using the algorithm having a relatively high priority, so that security of communication between the first node and the second node can be improved.

With reference to the second aspect and the possible implementations of the second aspect, in a possible implementation, the first algorithm negotiation request information further includes a second fresh parameter, the second fresh parameter is a parameter related to time validity of the first algorithm negotiation request information, and the method further includes sending second verification information to the first node, where the second verification information is obtained based on the first information, the preset shared key, the second fresh parameter, and the first KDF. Based on the foregoing method, the second node may perform integrity protection on the first information by using the second verification information.

With reference to the second aspect and the possible implementations of the second aspect, in a possible implementation, the method further includes sending second algorithm negotiation request information to the first node, where the second algorithm negotiation request information is used to indicate one or more algorithms and one or more KDFs; and receiving third information from the first node, where the third information is used to indicate that the one or more algorithms and the one or more KDFs indicated by the second algorithm negotiation request information are not supported or are not applicable. Based on the foregoing method, the second node may send, to the first node, the second algorithm negotiation request information used to indicate the one or more algorithms and the one or more KDFs, and receive, from the first node, the third information used to indicate that the one or more algorithms and the one or more KDFs indicated by the second algorithm negotiation request information are not supported or are not applicable. In this way, the first node and the second node may negotiate an algorithm and a KDF by performing communication a plurality of times, to improve a success rate of negotiating the algorithm and the KDF by the first node and the second node.

With reference to the second aspect and the possible implementations of the second aspect, in a possible implementation, the one or more algorithms indicated by the second algorithm negotiation request information are different from the one or more algorithms indicated by the first algorithm negotiation request information; and the one or more KDFs indicated by the second algorithm negotiation request information are different from the one or more KDFs indicated by the first algorithm negotiation request information. Based on the foregoing method, the second node may indicate one or more algorithms and one or more KDFs to the first node a plurality of times, so that the first node determines, based on the one or more received algorithms and the one or more received KDFs, an algorithm and a KDF that are used for communication with the second node. This improves a success rate of negotiating the algorithm and the KDF by the first node and the second node.

According to a third aspect, an embodiment of this application provides a communications apparatus, to implement the method in any one of the first aspect or the possible implementations of the first aspect. The apparatus includes a corresponding unit or component configured to perform the method. The unit included in the apparatus may be implemented by software and/or hardware. For example, the apparatus may be a first node, or a chip, a chip system, a processor, or the like that can support the first node in implementing the foregoing method.

According to a fourth aspect, an embodiment of this application provides a communications apparatus, to implement the method in any one of the second aspect or the possible implementations of the second aspect. The apparatus includes a corresponding unit or component configured to perform the method. The unit included in the apparatus may be implemented by software and/or hardware. For example, the apparatus may be a second node, or a chip, a chip system, a processor, or the like that can support the second node in implementing the foregoing method.

According to a fifth aspect, an embodiment of this application provides a communications apparatus, including a processor, where the processor is coupled to a memory, the memory is configured to store programs or instructions, and when the programs or the instructions are executed by the processor, the apparatus is enabled to implement the method in any one of the first aspect or the possible implementations of the first aspect.

According to a sixth aspect, an embodiment of this application provides a communications apparatus, including a processor, where the processor is coupled to a memory, the memory is configured to store programs or instructions, and when the programs or the instructions are executed by the processor, the apparatus is enabled to implement the method in any one of the second aspect or the possible implementations of the second aspect.

According to a seventh aspect, an embodiment of this application provides a communications apparatus. The apparatus is configured to implement the method in any one of the first aspect or the possible implementations of the first aspect.

According to an eighth aspect, an embodiment of this application provides a communications apparatus. The apparatus is configured to implement the method in any one of the second aspect or the possible implementations of the second aspect.

According to a ninth aspect, an embodiment of this application provides a computer-readable medium. The computer-readable medium stores computer programs or instructions, and when the computer programs or instructions are executed, a computer is enabled to perform the method in any one of the first aspect or the possible implementations of the first aspect.

According to a tenth aspect, an embodiment of this application provides a computer-readable medium. The computer-readable medium stores computer programs or instructions, and when the computer programs or instructions are executed, a computer is enabled to perform the method in any one of the second aspect or the possible implementations of the second aspect.

According to an eleventh aspect, an embodiment of this application provides a computer program product. The computer program product includes computer program code. When the computer program code is run on a computer, the computer is enabled to perform the method in any one of the first aspect or the possible implementations of the first aspect.

According to a twelfth aspect, an embodiment of this application provides a computer program product. The computer program product includes computer program code. When the computer program code is run on a computer, the computer is enabled to perform the method in any one of the second aspect or the possible implementations of the second aspect.

According to a thirteenth aspect, an embodiment of this application provides a chip, including at least one processor, where the processor is coupled to a memory, the memory is configured to store programs or instructions, and when the programs or the instructions are executed by the processor, the chip is enabled to implement the method in any one of the first aspect or the possible implementations of the first aspect.

According to a fourteenth aspect, an embodiment of this application provides a chip, including at least one processor, where the processor is coupled to a memory, the memory is configured to store programs or instructions, and when the programs or the instructions are executed by the processor, the chip is enabled to implement the method in any one of the second aspect or the possible implementations of the second aspect.

According to a fifteenth aspect, an embodiment of this application provides a communications system. The system includes the apparatus according to the third aspect and/or the apparatus according to the fourth aspect, or the system includes the apparatus according to the fifth aspect and/or the apparatus according to the sixth aspect, or the system includes the apparatus according to the seventh aspect and/or the apparatus according to the eighth aspect.

It may be understood that any one of the communications apparatus, the chip, the computer-readable medium, the computer program product, the communications system, or the like provided above is configured to perform a corresponding method provided above. Therefore, for beneficial effects that can be achieved by the communications apparatus, the chip, the computer-readable medium, the computer program product, the communications system, or the like, refer to beneficial effects in the corresponding method. Details are not described herein.

DESCRIPTION OF EMBODIMENTS

The following describes implementations of the embodiments of this application in detail with reference to the accompanying drawings.

A method provided in the embodiments of this application may be applied to various communications systems. For example, the communications systems may be a Long-Term Evolution (long term evolution, LTE) system, a 5th generation (5G) communications system, a new radio (NR) system, a Wi-Fi system, a communications system related to the 3rd Generation Partnership Project (3GPP), and a future evolved communications system. This is not limited. Only a communications system 10 shown in FIG. 1 is used as an example below to describe the method provided in the embodiments of this application.

Figure 1:
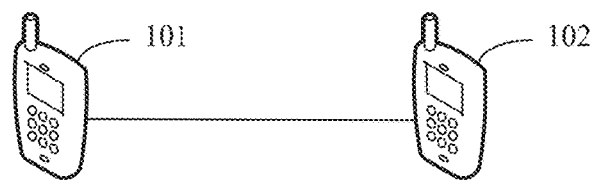
FIG. 1 is a schematic architectural diagram of a communications system according to an embodiment of this application.

FIG. 1 is a schematic architectural diagram of the communications system 10 according to an embodiment of this application. In FIG. 1, the communications system 10 may include a node 101 and a node 102 that can communicate with the node 101. FIG. 1 is merely a schematic diagram, and does not constitute a limitation on an applicable scenario of technical solutions provided in this application.

The node 101 or the node 102 in FIG. 1 may be any device having receiving and sending functions. The device includes but is not limited to an evolved NodeB (NodeB, eNB, or e-NodeB, evolutional Node B) in LTE, a gNodeB (gNB) or a transmission reception point (transmission receiving point/transmission reception point, TRP) in NR, a base station subsequently evolved from 3GPP, an access node in a Wi-Fi system, a wireless relay node, a wireless backhaul node, a data transfer device (for example, a router, a repeater, a bridge, or a switch), or the like. The base station may be a macro base station, a micro base station, a picocell base station, a small cell, a relay station, a balloon station, or the like. The node 101 or the node 102 may alternatively be a radio controller, a centralized unit (CU), and/or a distributed unit (DU) in a cloud radio access network (CRAN) scenario. The node 101 or the node 102 may alternatively be a server, a wearable device (such as a smartwatch, a smart band, or a pedometer), a machine communications device, a vehicle-mounted device, or the like. The node 101 or the node 102 may alternatively be a mobile phone, a tablet computer (Pad), a computer having wireless receiving and sending functions, a headset, a speaker, a virtual reality (VR) terminal device, an augmented reality (AR) terminal device, a terminal in machine type communication (MTC), a terminal in industrial control, a vehicle-mounted terminal device, a terminal in self driving, a terminal device in assisted driving, a terminal in telemedicine (remote medical), a terminal in a smart grid, a terminal in transportation safety, a terminal in a smart city, a terminal in a smart home, or the like. An application scenario is not limited in the embodiments of this application. Sometimes, the terminal may also be referred to as a terminal device, a user equipment (UE), an access terminal device, a vehicle-mounted terminal, an industrial control terminal, a UE unit, a UE station, a mobile station, a mobile console, a remote station, a remote terminal device, a mobile device, a UE terminal device, a wireless communications device, a machine terminal, a UE agent, a UE apparatus, or the like. The terminal may be fixed or mobile. The node 101 or the node 102 may alternatively be a vehicle cockpit domain device, or a module (such as a cockpit domain controller CDC), a camera, a screen, a microphone, a speaker, an electronic key, or a passive entry passive start system controller) in the vehicle cockpit domain device.

The communications system 10 shown in FIG. 1 is merely used as an example, but is not intended to limit the technical solutions of this application. A person skilled in the art should understand that, in a specific implementation process, the communications system 10 may further include another device, and a quantity of nodes may be determined based on a specific requirement. This is not limited.

Optionally, in the embodiments of this application, each node in FIG. 1, such as the node 101 or the node 102, may be a functional module in an apparatus. It may be understood that the functional module may be an element in a hardware device, for example, a communications chip or a communications component in a terminal device or a network device, or may be a software functional module running on hardware, or a virtualized function instantiated on a platform (for example, a cloud platform).

Figure 2:
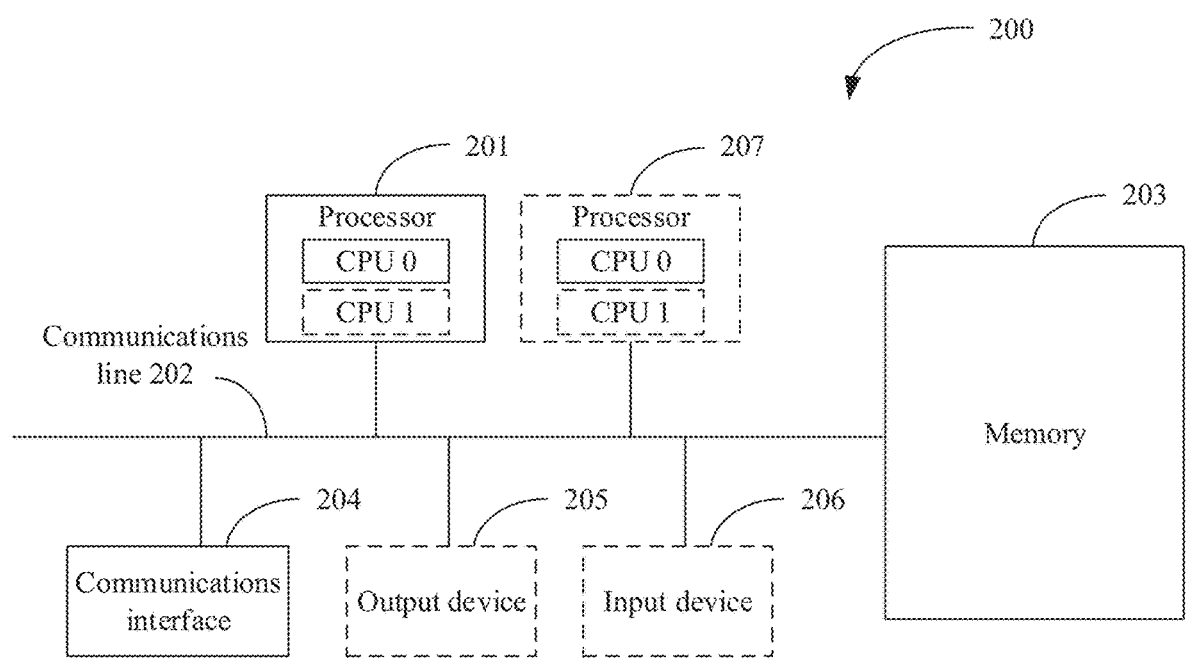
FIG. 2 is a schematic diagram of a hardware structure of a communications apparatus according to an embodiment of this application.

For example, each node in FIG. 1 may be implemented by using a communications apparatus 200 in FIG. 2. FIG. 2 is a schematic diagram of a hardware structure of a communications apparatus applicable to an embodiment of this application. The communications apparatus 200 may include at least one processor 201, a memory 203, and at least one communications interface 204. Optionally, the communications apparatus further includes a communications line 202.

The at least one processor 201 may include one or more of a general-purpose central processing unit (CPU), a microprocessor, an application-specific integrated circuit (ASIC), a field-programmable gate array (FPGA), or one or more integrated circuits configured to control program execution in the solutions of this application.

The communications line 202 may be configured to transmit information between the foregoing components. For example, the communications line 202 is a bus.

The communications interface 204 is configured to communicate with another device or a communications network, and is any apparatus of a transceiver type, such as an Ethernet interface, a radio access network (RAN) interface, or a wireless local area network (WLAN) interface. Alternatively, the communications interface 204 may provide input and output for the at least one processor 201, to complete sending or receiving of data, an instruction, or information. However, a connection structure is not limited to that shown in FIG. 2.

The memory 203 may be a read-only memory (ROM) or another type of static storage device capable of storing static information and instructions, or a random-access memory (RAM) or another type of dynamic storage device capable of storing information and instructions, or may be an electrically erasable programmable ROM (EEPROM), a compact disc ROM (CD-ROM) or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor through the communications line 202. Alternatively, the memory may be integrated with the processor. The memory provided in the embodiments of this application may usually be non-volatile. The memory 203 is configured to store computer-executable instructions for executing the solutions of this application, and the processor 201 controls the execution. The processor 201 is configured to execute the computer-executable instructions stored in the memory 203, to implement the method provided in the embodiments of this application.

Optionally, the computer-executable instruction in the embodiments of this application may also be referred to as application program code. This is not specifically limited in the embodiments of this application.

During specific implementation, in an embodiment, the processor 201 may include one or more CPUs, for example, a CPU 0 and a CPU 1 in FIG. 2.

During specific implementation, in an embodiment, the communications apparatus 200 may include a plurality of processors, for example, the processor 201 and a processor 207 in FIG. 2. Each of the processors may be a single-core (single-CPU) processor or may be a multi-core (multi-CPU) processor. The processor herein may refer to one or more devices, circuits, and/or processing cores configured to process data (for example, a computer program instruction).

During specific implementation, in an embodiment, the communications apparatus 200 may further include an output device 205 and an input device 206. The output device 205 communicates with the processor 201, and may display information in a plurality of manners. For example, the output device 205 may be a liquid-crystal display (LCD), a light-emitting diode (LED) display device, a cathode ray tube (CRT) display device, or a projector. The input device 206 communicates with the processor 201, and may receive input from a user in a plurality of manners. For example, the input device 206 may be a mouse, a keyboard, a touchscreen device, or a sensing device.

During specific implementation, the communications apparatus 200 may be a desktop computer, a portable computer, a network server, a personal digital assistant (PDA), a mobile phone, a tablet computer, a wireless terminal device, an embedded device, or a device having a structure similar to that in FIG. 2. A type of the communications apparatus 200 is not limited in the embodiments of this application.

The following specifically describes a communications method in the embodiments of this application with reference to FIG. 1 and FIG. 2. A node in the following embodiments may have the components shown in FIG. 2.

It should be noted that an algorithm in the embodiments of this application may be a signaling plane algorithm, a user plane algorithm, or a signaling plane algorithm and a user plane algorithm. A signaling plane is used to transmit control-type signaling, for example, access request information or identity authentication information, and a user plane is used to transmit data. The signaling plane algorithm is used for signaling plane communication between a first node and a second node. The signaling plane algorithm may include an encryption algorithm, and/or an integrity protection algorithm, and/or an authenticated encryption algorithm. The user plane algorithm is used for user plane communication between the first node and the second node. The user plane algorithm may include an encryption algorithm, and/or an integrity protection algorithm, and/or an authenticated encryption algorithm.

In the embodiments of this application, the user plane algorithm may be the same as or different from the signaling plane algorithm. That the signaling plane algorithm is the same as the user plane algorithm may be expressed as follows. A quantity of signaling plane algorithms is the same as a quantity of user plane algorithms, a type of the signaling plane algorithm is the same as a type of the user plane algorithm, and an identifier of the signaling plane algorithm is the same as an identifier of the user plane algorithm. For example, there are two signaling plane algorithms: an encryption algorithm 1 and an integrity protection algorithm 1, and there are also two user plane algorithms: the encryption algorithm 1 and the integrity protection algorithm 1. That the signaling plane algorithm is different from the user plane algorithm may be expressed as follows. A type of the signaling plane algorithm is different from a type of the user plane algorithm (for example, the signaling plane algorithm includes an encryption algorithm and an integrity protection algorithm, and the user plane algorithm includes an authenticated encryption algorithm), and/or a quantity of signaling plane algorithms is different from a quantity of user plane algorithms (for example, there are two signaling plane algorithms, and there is one user plane algorithm); or when a type of the signaling plane algorithm is the same as a type of the user plane algorithm, and a quantity of signaling plane algorithms is the same as a quantity of user plane algorithms, an identifier of the signaling plane algorithm is different from an identifier of the user plane algorithm (for example, there are two signaling plane algorithms: an encryption algorithm 1 and an integrity protection algorithm 1, and there are two user plane algorithms: an encryption algorithm 2 and an integrity protection algorithm 2).

It should be noted that, in the following embodiments of this application, a name of a message between nodes, a name of each parameter in the message, or the like is merely an example, and may alternatively be another name during specific implementation. This is not specifically limited in the embodiments of this application.

It may be understood that, in the embodiments of this application, the first node or the second node may perform some or all of steps in the embodiments of this application. These steps are merely examples. In the embodiments of this application, other steps or variations of various steps may be alternatively performed. In addition, the steps may be performed in a sequence different from a sequence presented in the embodiments of this application, and it is possible that not all the steps in the embodiments of this application need to be performed.

Figure 3:
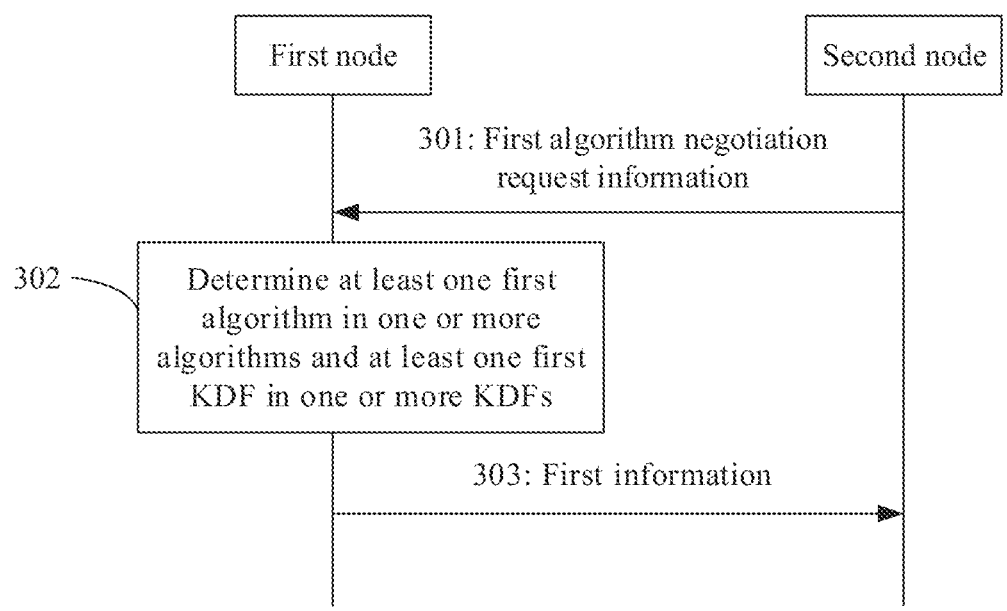
FIG. 3 is a schematic flowchart 1 of a communications method according to an embodiment of this application.

FIG. 3 shows a communications method according to an embodiment of this application. The communications method includes step 301 to step 303.

Step 301: A second node sends first algorithm negotiation request information to a first node.

The second node may be any node in FIG. 1. For example, the second node may be the node 101 or the node 102 shown in FIG. 1. When the second node is the node 101 shown in FIG. 1, the first node may be the node 102 shown in FIG. 1. When the second node is the node 102 shown in FIG. 1, the first node may be the node 101 shown in FIG. 1.

The first algorithm negotiation request information may be used to indicate one or more algorithms and one or more KDFs. The one or more algorithms may be one or more algorithms supported by the second node. The one or more KDFs may be one or more KDFs supported by the second node. The KDF may be used to generate a key corresponding to some or all of the one or more algorithms.

It should be noted herein that the one or more algorithms supported by the second node and/or the one or more KDFs supported by the second node may be collectively referred to as a security capability of the second node.

The one or more algorithms may be algorithms of a same type, or may be algorithms of different types. For example, the one or more algorithms include an encryption algorithm, and/or an integrity protection algorithm, and/or an authenticated encryption algorithm. Further, the one or more algorithms include at least one encryption algorithm, and/or at least one integrity protection algorithm, and/or at least one authenticated encryption algorithm. The encryption algorithm may be used to encrypt or decrypt some or all communication information between the first node and the second node by using a key of the encryption algorithm. The integrity protection algorithm may be used to: perform integrity protection on some or all communication information between the first node and the second node by using a key corresponding to the integrity protection algorithm, or verify integrity of some or all communication information between the first node and the second node by using a key corresponding to the integrity protection algorithm. The authenticated encryption algorithm may be used to encrypt or decrypt some or all communication information between the first node and the second node by using a key of the authenticated encryption algorithm, and the authenticated encryption algorithm may be used to: perform integrity protection on some or all communication information between the first node and the second node by using the key of the authenticated encryption algorithm, or verify integrity of some or all communication information between the first node and the second node by using the key of the authenticated encryption algorithm.

It may be understood that a quantity of encryption algorithms, integrity protection algorithms, or authenticated encryption algorithms indicated by the first algorithm negotiation request information is not limited in this embodiment of this application. For example, the first algorithm negotiation request information may indicate eight algorithms, and the eight algorithms include two encryption algorithms, three integrity protection algorithms, and three authenticated encryption algorithms.

Optionally, the one or more algorithms and the one or more KDFs indicated by the first algorithm negotiation request information are sorted based on priorities. For example, the one or more algorithms and the one or more KDFs indicated by the first algorithm negotiation request information are sorted in descending order of priorities, or the one or more algorithms and the one or more KDFs indicated by the first algorithm negotiation request information are sorted in ascending order of priorities.

For example, the one or more algorithms and the one or more KDFs indicated by the first algorithm negotiation request information are sorted in descending order of priorities. If the first algorithm negotiation request information is used to indicate an encryption algorithm 1, an encryption algorithm 2, an integrity protection algorithm 1, an integrity protection algorithm 2, a KDF 1, and a KDF 2, a priority of the encryption algorithm is higher than or equal to a priority of the integrity protection algorithm. For the encryption algorithms, a priority of the encryption algorithm 1 is higher than or equal to a priority of the encryption algorithm 2. For the integrity protection algorithms, a priority of the integrity protection algorithm 1 is higher than or equal to a priority of the integrity protection algorithm 2. For the KDFs, a priority of the KDF 1 is higher than or equal to a priority of the KDF 2.

For example, the one or more algorithms and the one or more KDFs indicated by the first algorithm negotiation request information are sorted in ascending order of priorities. If the first algorithm negotiation request information is used to indicate an encryption algorithm 1, an encryption algorithm 2, an integrity protection algorithm 1, an integrity protection algorithm 2, a KDF 1, and a KDF 2, a priority of the encryption algorithm is lower than or equal to a priority of the integrity protection algorithm. For the encryption algorithms, a priority of the encryption algorithm 1 is lower than or equal to a priority of the encryption algorithm 2. For the integrity protection algorithms, a priority of the integrity protection algorithm 1 is lower than or equal to a priority of the integrity protection algorithm 2. For the KDFs, a priority of the KDF 1 is lower than or equal to a priority of the KDF 2.

It may be understood that, if the one or more algorithms include both a signaling plane algorithm and a user plane algorithm, the one or more algorithms are separately sorted based on a priority of the signaling plane algorithm and a priority of the user plane algorithm.

For example, the one or more algorithms and the one or more KDFs indicated by the first algorithm negotiation request information are sorted in descending order of priorities. It is assumed that the algorithms and the KDFs indicated by the first algorithm negotiation request information may be shown in Table 1. In Table 1, user plane algorithms include an encryption algorithm 1, an encryption algorithm 2, and an integrity protection algorithm 1, signaling plane algorithms include the encryption algorithm 2, the integrity protection algorithm 1, and an integrity protection algorithm 2, and KDFs include a KDF 1, a KDF 2, and a KDF 3. In this case, for the user plane algorithms and the signaling plane algorithms, a priority of the encryption algorithm is higher than or equal to a priority of the integrity protection algorithm. For the encryption algorithms included in the user plane algorithms, a priority of the encryption algorithm 1 is higher than or equal to a priority of the encryption algorithm 2. For the integrity protection algorithms included in the signaling plane algorithms, a priority of integrity protection algorithm 1 is higher than or equal to a priority of integrity protection algorithm 2.

TABLE 1

| User plane algorithm | Signaling plane algorithm | KDF |
|---|---|---|
| Encryption algorithm 1 | Algorithm 2 | KDF 1 |
| Encryption algorithm 2 | Integrity protection algorithm 1 | KDF 2 |
| Integrity protection algorithm 1 | Integrity protection algorithm 2 | KDF 3 |

For example, the one or more algorithms and the one or more KDFs indicated by the first algorithm negotiation request information are sorted in descending order of priorities. The algorithms and the KDFs indicated by the first algorithm negotiation request information may alternatively be shown in Table 2. In Table 2, for user plane algorithms/KDFs, a priority of an authenticated encryption algorithm is higher than priorities of an encryption algorithm and an integrity protection algorithm, and the priorities of the encryption algorithm and the integrity protection algorithm are the same. Herein, a priority of an authenticated encryption algorithm 1 is higher than or equal to a priority of an authenticated encryption algorithm 2, a priority of an integrity protection algorithm 1 is higher than or equal to a priority of an integrity protection algorithm 2, the priority of the integrity protection algorithm 2 is higher than or equal to a priority of an encryption algorithm 1, the priority of the encryption algorithm 1 is higher than or equal to a priority of an encryption algorithm 2, and a priority of a KDF 1 is higher than or equal to a priority of a KDF 2. For signaling plane algorithms/KDFs, priorities of an encryption algorithm and an integrity protection algorithm are the same, and the priorities of the encryption algorithm and the integrity protection algorithm are higher than a priority of an authenticated encryption algorithm. Herein, a priority of the integrity protection algorithm 1 is higher than or equal to a priority of the integrity protection algorithm 2, the priority of the integrity protection algorithm 2 is higher than or equal to a priority of the encryption algorithm 1, the priority of the encryption algorithm 1 is higher than or equal to a priority of the encryption algorithm 2, a priority of the authenticated encryption algorithm 2 is higher than or equal to a priority of the authenticated encryption algorithm 1, and a priority of a KDF 3 is higher than or equal to a priority of a KDF 4.

TABLE 2

| User plane algorithm/KDF priority | User plane algorithm/KDF identifier | Signaling plane algorithm/KDF priority | Signaling plane algorithm/KDF identifier |
|---|---|---|---|
| Priority 1 | Authenticated encryption algorithm 1 | Priority 1 | Integrity protection algorithm 1 |
|  | Authenticated encryption algorithm 2 |  | Integrity protection algorithm 2 |
| Priority 2 | Integrity protection algorithm 1 |  | Encryption algorithm 1 |
|  | Integrity protection algorithm 2 |  | Encryption algorithm 2 |
|  | Encryption algorithm 1 | Priority 2 | Authenticated encryption algorithm 2 |
|  | Encryption algorithm 2 |  | Authenticated encryption algorithm 1 |
| KDF priority | KDF 1 | KDF priority | KDF 3 |
|  | KDF 2 |  | KDF 4 |

The first algorithm negotiation request information may indicate the one or more algorithms and the one or more KDFs in any one of the following manners.

Manner 1.1: The first algorithm negotiation request information includes one or more identifiers of the one or more algorithms and one or more identifiers of the one or more KDFs.

For example, algorithm/KDF identifiers shown in Table 3 are used as an example. When the first algorithm negotiation request information includes an identifier (ID) 1, an ID 3, and an ID 5, the first algorithm negotiation request information is used to indicate an algorithm 1, an algorithm 3, and a KDF 2. When the first algorithm negotiation request information includes an ID 2 and an ID 4, the first algorithm negotiation request information is used to indicate an algorithm 2 and a KDF 1.

TABLE 3

| Algorithm/KDF | Algorithm/KDF identifier |
|---|---|
| Algorithm 1 | ID 1 |
| Algorithm 2 | ID 2 |
| Algorithm 3 | ID 3 |
| KDF 1 | ID 4 |
| KDF 2 | ID 5 |

It may be understood that Table 1 to Table 3 are merely examples of the algorithms indicated by the first algorithm negotiation request information. In specific application, the algorithms indicated by the first algorithm negotiation request information may alternatively be in other forms. This is not limited.

Manner 1.2: The first algorithm negotiation request information includes one bit sequence, one bit in the bit sequence corresponds to one algorithm or one KDF, and each bit in the bit sequence may indicate, by using 0 or 1, whether the first algorithm negotiation request information indicates an algorithm or a KDF corresponding to the bit. For example, if the bit is 1, it may indicate that the first algorithm negotiation request information indicates the algorithm or the KDF corresponding to the bit, or if the bit is 0, it may indicate that the first algorithm negotiation request information does not indicate the algorithm or the KDF corresponding to the bit, and vice versa.

For example, the first algorithm negotiation request information includes five bits, and in the five bits, the first bit corresponds to an algorithm 1, the second bit corresponds to an algorithm 2, the third bit corresponds to an algorithm 3, the fourth bit corresponds to a KDF 1, and the fifth bit corresponds to a KDF 2. If the five bits are 01010, it may indicate that the first algorithm negotiation request information is used to indicate the algorithm 2 and the KDF 1. If the five bits are 11001, it may indicate that the first algorithm negotiation request information is used to indicate the algorithm 1, the algorithm 2, and the KDF 2.

Manner 1.3: The first algorithm negotiation request information includes two bit sequences, where lengths of the two bit sequences may be the same or different.

For one of the bit sequences, one bit in the bit sequence corresponds to one algorithm, and each bit in the bit sequence may indicate, by using 0 or 1, whether the first algorithm negotiation request information indicates an algorithm corresponding to the bit. For example, if the bit is 1, it may indicate that the first algorithm negotiation request information indicates the algorithm corresponding to the bit, or if the bit is 0, it may indicate that the first algorithm negotiation request information does not indicate the algorithm corresponding to the bit, and vice versa.

For the other one of the bit sequences, one bit in the bit sequence corresponds to one KDF, and each bit in the bit sequence may indicate, by using 0 or 1, whether the first algorithm negotiation request information indicates a KDF corresponding to the bit. For example, if the bit is 1, it may indicate that the first algorithm negotiation request information indicates the KDF corresponding to the bit, or if the bit is 0, it may indicate that the first algorithm negotiation request information does not indicate the KDF corresponding to the bit, and vice versa.

For example, the first algorithm negotiation request information includes two bit sequences, one of the bit sequences includes three bits, the first bit in the three bits corresponds to an algorithm 1, the second bit in the three bits corresponds to an algorithm 2, the third bit in the three bits corresponds to an algorithm 3, the other one of the bit sequences includes two bits, the first bit in the two bits corresponds to a KDF 1, and the second bit in the two bits corresponds to a KDF 2. If the first algorithm negotiation request information includes 110 and 01, it may indicate that the first algorithm negotiation request information is used to indicate the algorithm 1, the algorithm 2, and the KDF 2. If the first algorithm negotiation request information includes 010 and 11, it may indicate that the first algorithm negotiation request information is used to indicate the algorithm 2, the KDF 1, and the KDF 2.

Optionally, the first algorithm negotiation request information further includes an identifier of the second node and a second fresh parameter.

The identifier of the second node may be used to identify the second node. The second fresh parameter is a parameter related to time validity of the first algorithm negotiation request information. For example, the second fresh parameter includes a value of a counter in the second node or a first nonce. The value of the counter may be a value that is of the counter of the second node and that exists when the second node determines to send the first algorithm negotiation request information, and the counter may be used to record a quantity of times of communication between the first node and the second node. The first nonce may be a nonce generated by the second node when the second node determines to send the first algorithm negotiation request information.

Optionally, before step 301, the second node detects whether the second node has an algorithm and a KDF that are negotiated with the first node. If the second node has the algorithm and the KDF that are negotiated with the first node, the second node communicates with the first node by using the negotiated algorithm and KDF. If the second node does not have the algorithm or the KDF negotiated with the first node, the second node performs step 301.

Step 302: The first node receives the first algorithm negotiation request information from the second node, and determines at least one first algorithm in the one or more algorithms and at least one first KDF in the one or more KDFs.

It should be noted herein that one or more algorithms supported by the first node and/or one or more KDFs supported by the first node may be collectively referred to as a security capability of the first node.

Optionally, the at least one first algorithm includes an encryption algorithm; the at least one first algorithm includes an integrity protection algorithm; the at least one first algorithm includes an encryption algorithm and an integrity protection algorithm; or the at least one first algorithm includes an authenticated encryption algorithm.

Optionally, a plurality of algorithms correspond to corresponding priorities. A plurality of KDFs correspond to corresponding priorities.

In a possible implementation, the one or more algorithms and the one or more KDFs indicated by the first algorithm negotiation request information are sorted based on priorities. For details, refer to the description in step 301. Details are not described again.

In another possible implementation, there is a correspondence between an identifier of an algorithm and a priority of the algorithm. Optionally, the correspondence is predefined, for example, defined in a standard or a protocol, or the correspondence is preset and may be preconfigured for a corresponding node by using any other device. For example, a priority of an algorithm with a larger identifier is higher than a priority of an algorithm with a smaller identifier. Alternatively, a priority of an algorithm with a smaller identifier is higher than a priority of an algorithm with a larger identifier. For example, a priority of an algorithm 2 is higher than a priority of an algorithm 1. Alternatively, a priority of an algorithm 1 is higher than a priority of an algorithm 2. Likewise, there is a correspondence between an identifier of a KDF and a priority of the KDF. For example, a priority of a KDF with a larger identifier is higher than a priority of a KDF with a smaller identifier. Alternatively, a priority of a KDF with a smaller identifier is higher than a priority of a KDF with a larger identifier. For ease of description, the correspondence is mainly explained in a list manner below. However, a person skilled in the art may know that this application includes but is not limited to presenting the correspondence in a table manner.

In still another possible implementation, priorities of a plurality of algorithms are presented by using an algorithm priority list. Priorities of a plurality of KDFs are presented by using a KDF priority list.

Optionally, the algorithm priority list includes an encryption algorithm priority list, and/or an integrity protection algorithm priority list, and/or an authenticated encryption algorithm priority list.

It may be understood that, if the algorithms in this embodiment of this application are signaling plane algorithms and user plane algorithms, the algorithm priority list includes a user plane algorithm priority list and/or a signaling plane algorithm priority list. The user plane algorithm priority list may be used to determine a first algorithm of a user plane, and the signaling plane algorithm priority list may be used to determine a first algorithm of a signaling plane. The user plane algorithm priority list and the signaling plane algorithm priority list may be the same or different.

It may be understood that the algorithm priority list includes one or more algorithms, and the one or more algorithms included in the algorithm priority list are sorted based on priorities of the algorithms. For example, the encryption algorithm priority list is used as an example. The encryption algorithm priority list includes an algorithm 1, an algorithm 2, and an algorithm 3, and a priority of the algorithm 1≥a priority of the algorithm 2≥a priority of the algorithm 3, or a priority of the algorithm 1≤a priority of the algorithm 2≤a priority of the algorithm 3. The KDF priority list includes one or more KDFs, and the one or more KDFs are sorted based on priorities of the KDFs. For example, the KDF priority list includes a KDF 1, a KDF 2, and a KDF 3, and a priority of the KDF 1≥a priority of the KDF 2≥a priority of the KDF 3, or a priority of the KDF 1≤a priority of the KDF 2≤a priority of the KDF 3.

Optionally, the algorithms in the algorithm priority list are sorted in descending order or ascending order of the priorities of the algorithms. The KDFs in the KDF priority list are sorted in descending order or ascending order of the priorities of the KDFs.

For example, the algorithm priority list includes the encryption algorithm priority list, the integrity protection algorithm priority list, and the authenticated encryption algorithm priority list, a priority of an authenticated encryption algorithm>a priority of an integrity protection algorithm≥a priority of an encryption algorithm, the encryption algorithm priority list includes an algorithm 1 and an algorithm 2, a priority of the algorithm 1 is higher than a priority of the algorithm 2, the integrity protection algorithm priority list includes an algorithm 3 and an algorithm 4, a priority of the algorithm 3 is higher than a priority of the algorithm 4, the authenticated encryption algorithm priority list includes an algorithm 5 and an algorithm 6, a priority of the algorithm 5 is higher than a priority of the algorithm 6, and algorithms in each priority list are sorted in descending order of priorities of the algorithms. The algorithm priority list may be shown in Table 4. Table 4 is merely an example of the algorithm priority list, and the algorithm priority list may alternatively be in another form. This is not limited.

TABLE 4

| Algorithm type | Algorithm identifier |
| --- | --- |
| Authenticated encryption algorithm | Algorithm 5 |
|  | Algorithm 6 |
| Integrity protection algorithm | Algorithm 3 |
|  | Algorithm 4 |
| Encryption algorithm | Algorithm 1 |
|  | Algorithm 2 |

It may be understood that, for the foregoing example, when the priority of the integrity protection algorithm is the same as the priority of the encryption algorithm, the algorithm priority list may be shown in Table 5. In Table 5, the priority of the authenticated encryption algorithm is a priority 1, the priorities of the encryption algorithm and the integrity protection algorithm are a priority 2, and the priority 1 is higher than the priority 2.

TABLE 5

| Algorithm priority | Algorithm type | Algorithm identifier |
| --- | --- | --- |
| Priority 1 | Authenticated encryption algorithm | Algorithm 5 |
|  |  | Algorithm 6 |
| Priority 2 | Integrity protection algorithm | Algorithm 3 |
|  |  | Algorithm 4 |
|  | Encryption algorithm | Algorithm 1 |
|  |  | Algorithm 2 |

Optionally, the at least one first algorithm is an algorithm that is supported by the first node and that has a highest priority in the one or more algorithms. The at least one first algorithm corresponds to one or more algorithm types. For example, if the at least one first algorithm includes one algorithm, the at least one first algorithm corresponds to one algorithm type. If the at least one first algorithm includes a plurality of algorithms, each of the plurality of algorithms included in the at least one first algorithm corresponds to one algorithm type.

Further, the algorithm type corresponding to the at least one first algorithm is an algorithm type that is supported by the first node and that has a highest priority in algorithm types of the one or more algorithms.

In a possible implementation, the at least one first algorithm corresponds to one algorithm type, the algorithm type may correspond to a plurality of algorithms having different priorities, and the first algorithm is an algorithm that is supported by the first node and that has a highest priority in the algorithms corresponding to the algorithm type. Alternatively, if the algorithm type corresponds to only one algorithm, the first algorithm includes the algorithm corresponding to the algorithm type.

For example, the at least one first algorithm includes one algorithm, the first algorithm negotiation request information indicates the algorithm 3, the algorithm 4, the algorithm 1, and the algorithm 2, and a priority of the algorithm 3>a priority of the algorithm 4>a priority of the algorithm 1>a priority of the algorithm 2. If algorithms supported by the first node include the algorithm 4 and the algorithm 1, the at least one first algorithm is the algorithm 4. If algorithms supported by the first node include the algorithm 3 and the algorithm 1, the at least one first algorithm is the algorithm 3.

For example, the at least one first algorithm includes one algorithm, the algorithm priority list is shown in Table 5, and the first algorithm negotiation request information indicates the algorithm 5, the algorithm 6, the algorithm 3, and the algorithm 2. If algorithms supported by the first node include the algorithm 6, the algorithm 3, and the algorithm 1, the at least one first algorithm is the algorithm 6. If algorithms supported by the first node include the algorithm 5, the algorithm 4, and the algorithm 2, the at least one first algorithm is the algorithm 5.

In another possible implementation, the at least one first algorithm corresponds to a plurality of algorithm types, and priorities of the plurality of algorithm types are the same. Each algorithm type may correspond to one or more algorithms having different priorities, and the at least one first algorithm includes an algorithm that is supported by the first node and that has a highest priority in algorithms corresponding to each of the plurality of algorithm types. Alternatively, if an algorithm type corresponds to only one algorithm, the at least one first algorithm includes the algorithm corresponding to the algorithm type.

For example, the at least one first algorithm includes two algorithms, the algorithm priority list is shown in Table 6, and the first algorithm negotiation request information indicates the algorithm 5, the algorithm 6, the algorithm 3, and the algorithm 2. In Table 6, for algorithm types, priorities of an encryption algorithm and an integrity protection algorithm are the same, and the priorities of the encryption algorithm and the integrity protection algorithm are higher than a priority of an authenticated encryption algorithm. For the encryption algorithm, a priority of the algorithm 5 is higher than or equal to a priority of the algorithm 6. For the integrity protection algorithm, a priority of the algorithm 3 is higher than or equal to a priority of the algorithm 4. For the authenticated encryption algorithm, a priority of the algorithm 1 is higher than or equal to a priority of the algorithm 2. If algorithms supported by the first node include the algorithm 5, the algorithm 6, the algorithm 3, the algorithm 4, and the algorithm 1, the at least one first algorithm includes the algorithm 5 and the algorithm 3.

TABLE 6

| Priority | Algorithm type | Algorithm identifier |
|---|---|---|
| Priority 1 | Encryption algorithm | Algorithm 5 |
|  |  | Algorithm 6 |
|  | Integrity protection algorithm | Algorithm 3 |
|  |  | Algorithm 4 |
| Priority 2 | Authenticated encryption algorithm | Algorithm 1 |
|  |  | Algorithm 2 |

It should be noted that, when there are a plurality of algorithm types having a highest priority in algorithm types of algorithms indicated by the first algorithm negotiation request information, the first node may determine some of the plurality of algorithm types as algorithm types corresponding to the at least one first algorithm. For example, in the algorithm types of the algorithms indicated by the first algorithm negotiation request information, the algorithm types having the highest priority are an encryption algorithm and an integrity protection algorithm, and the first node determines the integrity protection algorithm as an algorithm type corresponding to the at least one first algorithm. In this scenario, encryption may not be performed by using the encryption algorithm. It should be further noted herein that, for ease of solution description, an expression "determining an algorithm type" is used. However, in an actual solution, the algorithm type may not be separately determined, but the at least one first algorithm corresponding to the algorithm type is directly determined.

It should be noted that the encryption algorithm may include a null encryption algorithm. The null encryption algorithm is used to generate an all-zero keystream. In other words, the null encryption algorithm may indicate that information is not encrypted. When the at least one first algorithm includes the null encryption algorithm, it indicates that communication information between the first node and the second node is not encrypted.

It may be understood that Table 4 to Table 6 are merely examples of the algorithm priority list. In specific application, the algorithm priority list may alternatively be in another form. This is not limited.

Optionally, a priority of an algorithm is related to security of the algorithm. For example, an algorithm with higher security has a higher priority, and an algorithm with lower security has a lower priority. A priority of a KDF is related to security of the KDF. For example, a KDF with higher security has a higher priority, and a KDF with lower security has a lower priority.

Optionally, the at least one first KDF is a KDF that is supported by the first node and that has a highest priority in the one or more KDFs. For example, if the at least one first KDF includes one KDF, the at least one first KDF is one KDF that is supported by the first node and that has a highest priority in the one or more KDFs. If the at least one first KDF includes m KDFs, and m is a positive integer greater than 1, the at least one first KDF is first m KDFs that are supported by the first node and that have a highest priority in the one or more KDFs.

For example, the at least one first KDF includes one KDF, the first algorithm negotiation request information indicates a KDF 1, a KDF 2, and a KDF 3, and a priority of the KDF 1>a priority of the KDF 2>a priority of the KDF 3. If KDFs supported by the first node include the KDF 2 and the KDF 3, the at least one first KDF is the KDF 2. If KDFs supported by the first node include the KDF 1 and the KDF 2, the at least one first KDF is the KDF 1.

Step 303: The first node sends first information to the second node.

The first information is used to indicate the at least one first algorithm and the at least one first KDF, so that the first node communicates with the second node by using the at least one first algorithm and the at least one first KDF.

Optionally, integrity protection is performed on the first information by using the at least one first algorithm; or the first information is encrypted by using the at least one first algorithm and integrity protection is performed on the first information by using the at least one first algorithm; or the first information is encrypted by using the at least one first algorithm.

A case in which integrity protection is performed on the first information by using the at least one first algorithm is first described.

The first information includes second information and a first MAC. The second information is used to indicate the at least one first algorithm and the at least one first KDF. For example, the second information includes information about the at least one first algorithm and information about the at least one first KDF. For example, the second information includes an identifier of the at least one first algorithm and an identifier of the at least one first KDF. The first MAC is obtained by performing integrity protection on the second information.

Further, the at least one first algorithm includes an integrity protection algorithm, or the at least one first algorithm includes an integrity protection algorithm and an encryption algorithm, and the first MAC is obtained by performing integrity protection on the second information by using the integrity protection algorithm; or the at least one first algorithm includes an authenticated encryption algorithm, and the first MAC is obtained by performing integrity protection on the second information by using the authenticated encryption algorithm. For details, refer to descriptions in the following method shown in FIG. 6 or FIG. 7.

The first information may indicate the at least one first algorithm and the at least one first KDF in any one of the following manners.

Manner 2.1: The second information includes an identifier of the first algorithm and an identifier of the first KDF.

For example, algorithm/KDF identifiers shown in Table 3 are used as an example. When the second information includes an ID 1 and an ID 5, the first information is used to indicate an algorithm 1 and a KDF 2. When the second information includes an ID 2 and an ID 4, the first information is used to indicate an algorithm 2 and a KDF 1.

For example, algorithm/KDF identifiers are shown in Table 7, the second information includes 16 bits, the first to the fourth bits are used to indicate an identifier of an encryption algorithm, the fifth to the eighth bits are used to indicate an identifier of an integrity protection algorithm, the ninth to the twelfth bits are used to indicate an identifier of an authenticated encryption algorithm, and the thirteenth to the sixteenth bits are used to indicate an identifier of a KDF. In Table 7, encryption algorithms include an algorithm 1, an algorithm 2, and an algorithm 3. An identifier of the algorithm 1 is 0000, and the algorithm 1 is a null encryption algorithm, and is used to generate an all-zero keystream. An identifier of the algorithm 2 is 0001, and an identifier of the algorithm 3 is 0010. Integrity protection algorithms include an algorithm 4 and an algorithm 5. An identifier of the algorithm 4 is 0001, and an identifier of the algorithm 5 is 0010. An authenticated encryption algorithm includes an algorithm 6, and an identifier of the algorithm 6 is 0011. KDFs include a KDF 1 and a KDF 2, an identifier of the KDF 1 is 0001, and an identifier of the KDF 2 is 0010. If the second information includes 0001000100000001, the first information is used to indicate the algorithm 2, the algorithm 4, and the KDF 1. If the second information includes 0000000000110010, the first information is used to indicate the algorithm 6 and the KDF 2.

TABLE 7

| Algorithm type | Algorithm/KDF | Algorithm/KDF identifier |
| --- | --- | --- |
| Encryption algorithm | Algorithm 1 | 0000 |
|  | Algorithm 2 | 0001 |
|  | Algorithm 3 | 0010 |
| Integrity protection algorithm | Algorithm 4 | 0001 |
|  | Algorithm 5 | 0010 |
| Authenticated encryption algorithm | Algorithm 6 | 0011 |
| KDF | KDF 1 | 0001 |
|  | KDF 2 | 0010 |

It may be understood that Table 7 is merely an example of the algorithm/KDF identifiers. In specific application, the algorithm/KDF identifiers may alternatively be in other forms. This is not limited.

Manner 2.2: The second information includes one bit sequence, and one bit in the bit sequence corresponds to one algorithm or one KDF. For example, one bit in the bit sequence corresponds to the one or more algorithms indicated by the first algorithm negotiation request information. Alternatively, one bit in the bit sequence corresponds to the KDF indicated by the first algorithm negotiation request information. Each bit in the bit sequence may indicate, by using 0 or 1, whether the first algorithm includes an algorithm corresponding to the bit, or whether the first KDF includes a KDF corresponding to the bit. For example, if the bit is 1, it may indicate that the first algorithm includes the algorithm corresponding to the bit or the first KDF includes the KDF corresponding to the bit, or if the bit is 0, it may indicate that the first algorithm does not include the algorithm corresponding to the bit or the first KDF does not include the KDF corresponding to the bit, and vice versa.

For example, the second information includes five bits, and in the five bits, the first bit corresponds to an algorithm 1, the second bit corresponds to an algorithm 2, the third bit corresponds to an algorithm 3, the fourth bit corresponds to a key KDF 1, and the fifth bit corresponds to a key KDF 2. If the five bits are 01010, it may indicate that the first algorithm includes the algorithm 2, and the first KDF includes the KDF 1. If the five bits are 11001, it may indicate that the first algorithm includes the algorithm 1 and the algorithm 2, and the first KDF includes the KDF 2.

Manner 2.3: The second information includes two bit sequences, where lengths of the two bit sequences may be the same or different.

For one of the bit sequences, one bit in the bit sequence corresponds to one algorithm. For example, one bit in the bit sequence corresponds to the one or more algorithms indicated by the first algorithm negotiation request information. Each bit in the bit sequence may indicate, by using 0 or 1, whether the first algorithm includes an algorithm corresponding to the bit. For example, if the bit is 1, it may indicate that the first algorithm includes the algorithm corresponding to the bit, or if the bit is 0, it may indicate that the first algorithm does not include the algorithm corresponding to the bit, and vice versa.

For the other one of the bit sequences, one bit in the bit sequence corresponds to one KDF. For example, one bit in the bit sequence corresponds to the KDF indicated by the first algorithm negotiation request information. Each bit in the bit sequence may indicate, by using 0 or 1, whether the first KDF includes a KDF corresponding to the bit. For example, if the bit is 1, it may indicate that the first KDF includes the KDF corresponding to the bit, or if the bit is 0, it may indicate that the first KDF does not include the KDF corresponding to the bit, and vice versa.

For example, the second information includes two bit sequences, one of the bit sequences includes three bits, the first bit in the three bits corresponds to an algorithm 1, the second bit in the three bits corresponds to an algorithm 2, the third bit in the three bits corresponds to an algorithm 3, the other one of the bit sequences includes two bits, the first bit in the two bits corresponds to a key KDF 1, and the second bit in the two bits corresponds to a key KDF 2. If the second information includes 110 and 01, it may indicate that the first algorithm includes the algorithm 1 and the algorithm 2, and the first KDF includes the KDF 2. If the second information includes 010 and 10, it may indicate that the first algorithm includes the algorithm 2, and the first KDF includes the KDF 1.

Optionally, the second information further includes information that is not related to indication for the first algorithm or the first KDF. For example, the second information further includes first verification information. Alternatively, the second information further includes a first fresh parameter and first verification information. Alternatively, the second information further includes indication information used to indicate the one or more algorithms and the one or more KDFs in step 301.

The first fresh parameter is a parameter related to time validity of the first information. For example, the first fresh parameter includes a value of a counter in the first node or a second nonce. The value of the counter may be a value that is of the counter of the first node and that exists when the first node determines to send the first information, and the counter may be used to record a quantity of times of communication between the first node and the second node. The second nonce may be a nonce generated when the first node determines to send the first information.

The first verification information is used by the second node to verify whether the first algorithm negotiation request information received by the first node is modified.

For example, the second information further includes the first verification information. The first verification information is obtained based on the first algorithm negotiation request information received by the first node, a preset shared key, and a second KDF. For example, AUTH 1=second KDF(K, first algorithm negotiation request information). Herein, AUTH 1 is the first verification information. K is the preset shared key, and the preset shared key is set in advance. Specifically, the preset shared key may be preconfigured for a corresponding node by using any other device. The second KDF may be the same as or different from the first KDF. If the second KDF is different from the first KDF, the second KDF may be a KDF that is preset in the first node and the second node.

For example, the second information further includes the first fresh parameter and the first verification information. The first verification information is obtained based on the first algorithm negotiation request information received by the first node, a preset shared key, the first fresh parameter, and a second KDF. For example, AUTH 1=second KDF(K, first fresh parameter, first algorithm negotiation request information). For descriptions of AUTH 1, K, and the second KDF, refer to the foregoing example. Details are not described again.

It may be understood that if the second information further includes the indication information used to indicate the one or more algorithms and the one or more KDFs in step 301, after receiving the indication information subsequently, the second node may determine, based on the indication information, whether the algorithm and the KDF in the first algorithm negotiation request information are modified.

The following describes a case in which the first information is encrypted by using the at least one first algorithm and integrity protection is performed on the first information by using the at least one first algorithm.

The first information includes encrypted information, second communication information, and a second MAC. The encrypted information is obtained by encrypting first communication information, and the first communication information does not indicate at least one of the at least one first algorithm or the at least one first KDF. The second communication information is used to indicate at least one of the at least one first algorithm and the at least one first KDF. The second MAC is obtained by performing integrity protection on the encrypted information and the second communication information.

Further, the at least one first algorithm includes an encryption algorithm and an integrity protection algorithm, the encrypted information is obtained by encrypting the first communication information by using the encryption algorithm, and the second MAC is obtained by performing integrity protection on the encrypted information and the second communication information by using the integrity protection algorithm; or the at least one first algorithm includes an authenticated encryption algorithm, the encrypted information is obtained by encrypting the first communication information by using the authenticated encryption algorithm, and the second MAC is obtained by performing integrity protection on the encrypted information and the second communication information by using the authenticated encryption algorithm. For details, refer to descriptions in the following method shown in FIG. 4 or FIG. 5.

The first information may indicate the at least one first algorithm and the at least one first KDF in any one of the following manners. The second communication information includes an identifier of the first algorithm and an identifier of the first KDF; or the second communication information includes one bit sequence, and one bit in the bit sequence corresponds to one algorithm or one KDF; or the second communication information includes two bit sequences, where for one of the bit sequences, one bit in the bit sequence corresponds to one algorithm, and for the other one of the bit sequences, one bit in the bit sequence corresponds to one KDF. For details, refer to the descriptions in the foregoing Manner 2.1 to Manner 2.3. Details are not described again.

Optionally, the first communication information includes information that is not related to indication for the first algorithm or the first KDF. For example, the first communication information includes first verification information. Alternatively, the first communication information includes a first fresh parameter and first verification information. Alternatively, the first communication information includes indication information used to indicate the one or more algorithms and the one or more KDFs in step 301. For descriptions of the first verification information, the first fresh parameter, and the indication information used to indicate the one or more algorithms and the one or more KDFs in step 301, refer to the foregoing corresponding descriptions provided when the second information includes information that is not related to the first algorithm or the first KDF. Details are not described again.

It may be understood that, in the foregoing description, the first node first encrypts the information and then obtains the second MAC. Alternatively, the first node may first obtain the second MAC, and then encrypts the first communication information. This is not limited. A difference is as follows: When the first node first encrypts the information and then obtains the second MAC, after receiving the first information, the second node needs to first verify integrity of the first information, and decrypt the encrypted information after verifying the integrity of the first information. When the first node first obtains the second MAC and then encrypts the first communication information, after receiving the first information, the second node first decrypts the encrypted information, and then verifies integrity of the first information.

The following describes a case in which the first information is encrypted by using the at least one first algorithm.

The first information includes encrypted information and second communication information. The encrypted information is obtained by encrypting first communication information. For descriptions of the first communication information and the second communication information, and descriptions of indicating the at least one first algorithm and the at least one first KDF by the first information, refer to the descriptions in the foregoing case in which the first information is encrypted by using the at least one first algorithm and integrity protection is performed on the first information by using the at least one first algorithm. Details are not described again.

Further, the at least one first algorithm includes an encryption algorithm. The encrypted information is obtained by encrypting the first communication information by using the encryption algorithm. For example, the encrypted information is obtained by encrypting the first communication information by using an encryption key. For descriptions of the encryption key, refer to descriptions in the following method shown in FIG. 5. Details are not described again.

It may be understood that, in a case in which the at least one first algorithm includes the encryption algorithm, when the first node communicates with the second node, a sender may encrypt to-be-sent information by using the encryption key to obtain encrypted information, and send the encrypted information to a receiver. After receiving the encrypted information, the receiver may decrypt the encrypted information by using the encryption key, to obtain the to-be-sent information of the sender. In this way, security of communication between the first node and the second node can be improved.

Correspondingly, the second node may receive the first information from the first node. Subsequently, the second node communicates with the first node by using the at least one first algorithm and the at least one first KDF.

Optionally, if integrity protection is performed on the first information by using the at least one first algorithm, the second node needs to verify integrity of the first information. If integrity protection is performed on the first information by using the at least one first algorithm, the second node receives the first information, obtains an authenticated encryption key based on the at least one first KDF, obtains a third MAC based on the at least one first algorithm and the second information, and verifies the integrity of the first information by using the third MAC. For details, refer to descriptions in the following method shown in FIG. 6 or FIG. 7. If the first information is encrypted by using the at least one first algorithm and integrity protection is performed on the first information by using the at least one first algorithm, the second node receives the first information, obtains a fourth MAC based on the at least one first algorithm, the encrypted information, and the second communication information, and verifies the integrity of the first information by using the fourth MAC. For details, refer to descriptions in the following method shown in FIG. 4 or FIG. 5.

Optionally, after receiving the first information, the second node sends acknowledgement information to the first node. The acknowledgement information is used to indicate that the second node receives the first information.

Optionally, after receiving the first information, the second node sends second verification information to the first node. The second verification information is used by the first node to verify whether the first information received by the second node is modified.

For example, the second verification information is obtained based on the first information received by the second node, the preset shared key, and the second KDF. For example, AUTH 2=second KDF(K, first information). In this case, after receiving the second verification information, the first node obtains third verification information based on the first information, the preset shared key, and the second KDF. For example, AUTH 3=second KDF(K, first information). If the third verification information is the same as the second verification information, it indicates that the first information received by the second node is not modified; or if the third verification information is different from the second verification information, it indicates that the first information received by the second node is modified. Herein, AUTH 2 is the second verification information, AUTH 3 is the third verification information, K is the preset shared key, and the second KDF may be the same as or different from the first KDF. If the second KDF is different from the first KDF, the second KDF may be a KDF that is preset in the first node and the second node.

For example, the second verification information is obtained based on the first information received by the second node, the preset shared key, the second fresh parameter, and the second KDF. For example, AUTH 2=second KDF(K, second fresh parameter, first information). In this case, after receiving the second verification information, the first node obtains third verification information based on the first information, the preset shared key, the second fresh parameter, and the second KDF. For example, AUTH 3=second KDF(K, second fresh parameter, first information). If the third verification information is the same as the second verification information, it indicates that the first information received by the second node is not modified; or if the third verification information is different from the second verification information, it indicates that the first information received by the second node is modified. For descriptions of AUTH 2, AUTH 3, K, and the second KDF, refer to the foregoing example. Details are not described again.

Optionally, integrity protection is performed on the acknowledgement information or the second verification information by using the at least one first algorithm. For a process of performing integrity protection on the acknowledgement information or the second verification information by using the at least one first algorithm, refer to descriptions of performing integrity protection on the first information by using the at least one first algorithm in the following method shown in FIG. 4, FIG. 5, FIG. 6, or FIG. 7. Details are not described again.

Based on the method shown in FIG. 3, the second node may send, to the first node, the first algorithm negotiation request information used to indicate the one or more algorithms and the one or more KDFs. After receiving the first algorithm negotiation request information, the first node may determine the at least one first algorithm and the at least one first KDF based on the first algorithm negotiation request information, and send, to the second node, the first information used to indicate the at least one first algorithm and the at least one first KDF. In this way, the first node and the second node may communicate with each other by using the at least one first algorithm and the at least one first KDF such that the first node and the second node can encrypt or decrypt communication information between the first node and the second node by using a same algorithm.

It may be understood that there are several different implementations for content included in the first information and/or different types and quantities of algorithms that may be included in the at least one first algorithm. For details, refer to the following first implementation, second implementation, third implementation, and fourth implementation of the method shown in FIG. 3.

Figure 4:
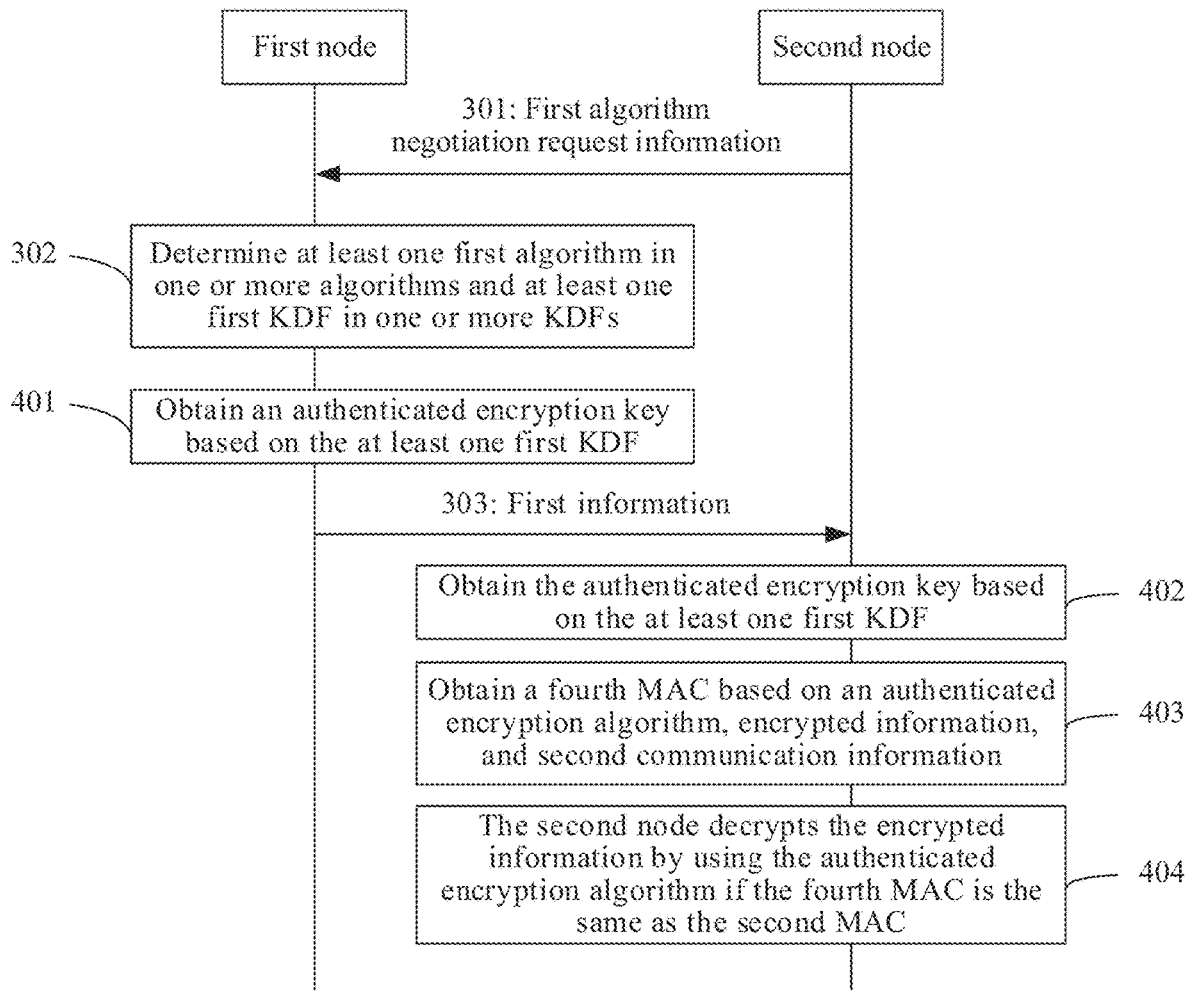
FIG. 4 is a schematic flowchart 2 of a communications method according to an embodiment of this application.

Optionally, in the first possible implementation of the method shown in FIG. 3, the first information includes the encrypted information, the second communication information, and the second MAC. When the at least one first algorithm includes an authenticated encryption algorithm, the encrypted information is obtained by encrypting the first communication information by using the authenticated encryption algorithm, and the second MAC is obtained by performing integrity protection on the encrypted information and the second communication information by using the authenticated encryption algorithm. After receiving the first information, the second node may obtain the fourth MAC based on the authenticated encryption algorithm, the encrypted information, and the second communication information, and verify integrity of the first information by using the fourth MAC. Specifically, as shown in FIG. 4, the method shown in FIG. 3 further includes step 401 to step 404.

Step 401: The first node obtains an authenticated encryption key based on the at least one first KDF.

The authenticated encryption key may be used to encrypt the first communication information, or the authenticated encryption key may be used to decrypt the encrypted information, and the authenticated encryption key may be used to perform integrity protection on the second communication information and the encrypted information, or the authenticated encryption key may be used to verify integrity of the second communication information and the encrypted information.

The first node may obtain the authenticated encryption key in any one of the following manners.

Manner 3.1: The first node uses a shared key as input of the first KDF to obtain the authenticated encryption key, that is, $K_c$=first KDF(K), where $K_c$ is the authenticated encryption key, and K is the shared key.

Manner 3.2: The first node uses a shared key and the second fresh parameter as input of the first KDF to obtain the authenticated encryption key, that is, $K_c$=first KDF(K, C), where $K_c$ is the authenticated encryption key, K is the shared key, and C is the second fresh parameter.

Manner 3.3: The first node uses a shared key, the second fresh parameter, and a first character string as input of the first KDF to obtain the authenticated encryption key, that is, $K_c$=first KDF(K, C, first character string), where $K_c$ is the authenticated encryption key, K is the shared key, and C is the second fresh parameter. The first character string may be used to identify an authenticated encryption algorithm. For example, when the at least one first algorithm is a user plane authenticated encryption algorithm, the first character string may be "user auth enc", which may identify the user plane authenticated encryption algorithm.

Manner 3.4: The first node uses a shared key, the second fresh parameter, a first character string, and a first identifier as input of the first KDF to obtain the authenticated encryption key, that is, $K_c$=first KDF(K, C, first character string, first identifier), where $K_c$ is the authenticated encryption key, K is the shared key, and C is the second fresh parameter. For descriptions of the first character string, refer to the descriptions in the foregoing Manner 3.3. Details are not described again. The first identifier may be used to identify a KDF used to generate the authenticated encryption key. For example, the first identifier may be an identifier of the first KDF.

It may be understood that the first identifier may include a number and/or a character. The first character string in Manner 3.4 may be an optional parameter.

Manner 3.5: The first node obtains a first intermediate key based on a shared key and the second fresh parameter; and the first node obtains the authenticated encryption key based on the first intermediate key and at least one of a first identifier and a first character string. For example, the first node uses the shared key and the second fresh parameter as input of a KDF 1 to obtain the first intermediate key, that is, $K_{mid1}$=KDF 1(K, C). The first node uses the first intermediate key, the first identifier, and the first character string as input of a KDF 2 to obtain the authenticated encryption key, that is, $K_c$=KDF 2($K_{mid1}$, first identifier, first character string), where $K_{mid1}$ is the first intermediate key, K is the shared key, C is the second fresh parameter, and $K_c$ is the authenticated encryption key. For descriptions of the first character string, refer to the descriptions in the foregoing Manner 3.3. For descriptions of the first identifier, refer to the descriptions in the foregoing Manner 3.4. Details are not described again.

The KDF 1 and the KDF 2 may be included in the at least one first KDF. The KDF 1 and the KDF 2 may be the same or different. For example, if the at least one first KDF includes one KDF, the KDF 1 and the KDF 2 are the same. If the at least one first KDF includes two or more KDFs, the KDF 1 and the KDF 2 are different.

It may be understood that, to more clearly describe the solution, how to obtain the authenticated encryption key is explained in two steps herein. In actual processing, the authenticated encryption key may alternatively be obtained in one step. The first intermediate key is only an intermediate result. To be specific, a manner of determining the authenticated encryption key satisfies: $K_c$=KDF 2(KDF 1(K, C), first algorithm, first character string).

Optionally, the shared key in the foregoing manner is preset in the first node, or the shared key in the foregoing manner is obtained by the first node through calculation before step 401.

Further, the second MAC is obtained based on the authenticated encryption algorithm, the encrypted information, the second communication information, and the authenticated encryption key. For example, the first node obtains the second MAC by using the encrypted information, the second communication information, and the authenticated encryption key as input of the authenticated encryption algorithm.

Step 402: The second node obtains the authenticated encryption key based on the at least one first KDF.

For a specific process in which the second node obtains the authenticated encryption key based on the at least one first KDF, refer to the corresponding descriptions in step 401 in which the first node obtains the authenticated encryption key based on the at least one first KDF. Details are not described again.

Step 403: The second node obtains the fourth MAC based on the authenticated encryption algorithm, the encrypted information, and the second communication information.

Further, the second node obtains the fourth MAC based on the authenticated encryption algorithm, the encrypted information, the second communication information, and the authenticated encryption key. For example, the second node obtains the fourth MAC by using the encrypted information, the second communication information, and the authenticated encryption key as input of the authenticated encryption algorithm.

It may be understood that the second node may further perform integrity protection on the encrypted information and some information in the second communication information. For example, the second node obtains the fourth MAC based on the encrypted information, the some information in the second communication information, the authenticated encryption algorithm, and the authenticated encryption key.

Step 404: The second node decrypts the encrypted information by using the authenticated encryption algorithm if the fourth MAC is the same as the second MAC.

Optionally, if the fourth MAC is the same as the second MAC, it indicates that the first communication information is not modified, and the second node decrypts the encrypted information by using the authenticated encryption key, to obtain the first communication information.

Optionally, if the fourth MAC is different from the second MAC, it indicates that the first communication information is modified, and the second node discards the first information. The second node may perform step 301 again, or the second node may indicate the first node to re-determine the at least one first algorithm and the at least one first KDF.

It may be understood that when the first communication information includes the indication information used to indicate one or more algorithms and one or more KDFs, after obtaining the first communication information, the second node may further verify whether the one or more algorithms and the one or more KDFs included in the first communication information are the same as the one or more algorithms and the one or more KDFs included in the first algorithm negotiation request information. If the one or more algorithms and the one or more KDFs included in the first communication information are the same as the one or more algorithms and the one or more KDFs included in the first algorithm negotiation request information, it indicates that the first algorithm negotiation request information is not modified, and a communication environment of the first node and the second node is secure. If the one or more algorithms and the one or more KDFs included in the first communication information are different from the one or more algorithms and the one or more KDFs included in the first algorithm negotiation request information, it indicates that the first algorithm negotiation request information is modified, and a communication environment of the first node and the second node is insecure.

It may be understood that, when the first communication information includes the first verification information, after obtaining the first communication information, the second node verifies, by using the first verification information, whether the first algorithm negotiation request information is modified. If the first algorithm negotiation request information is not modified, a communication environment of the first node and the second node is secure; or if the first algorithm negotiation request information is modified, a communication environment of the first node and the second node is insecure.

Based on the method shown in FIG. 4, if the at least one first algorithm includes the authenticated encryption algorithm, the first node and the second node may obtain the authenticated encryption key based on the at least one first KDF. Subsequently, the first node may encrypt the first communication information by using the authenticated encryption key to obtain the encrypted information, obtain the second MAC based on the authenticated encryption algorithm, the encrypted information, the second communication information, and the authenticated encryption key, and perform integrity protection on the first information by using the second MAC. The second node may obtain the fourth MAC based on the authenticated encryption algorithm, the encrypted information, the second communication information, and the authenticated encryption key, and verify integrity of the first information by using the fourth MAC. In this way, when the first node communicates with the second node, the first communication information may be encrypted by using the authenticated encryption algorithm, and integrity protection may be further performed on the first information by using the authenticated encryption algorithm. Therefore, security of communication between the first node and the second node can be improved.

Figure 5:
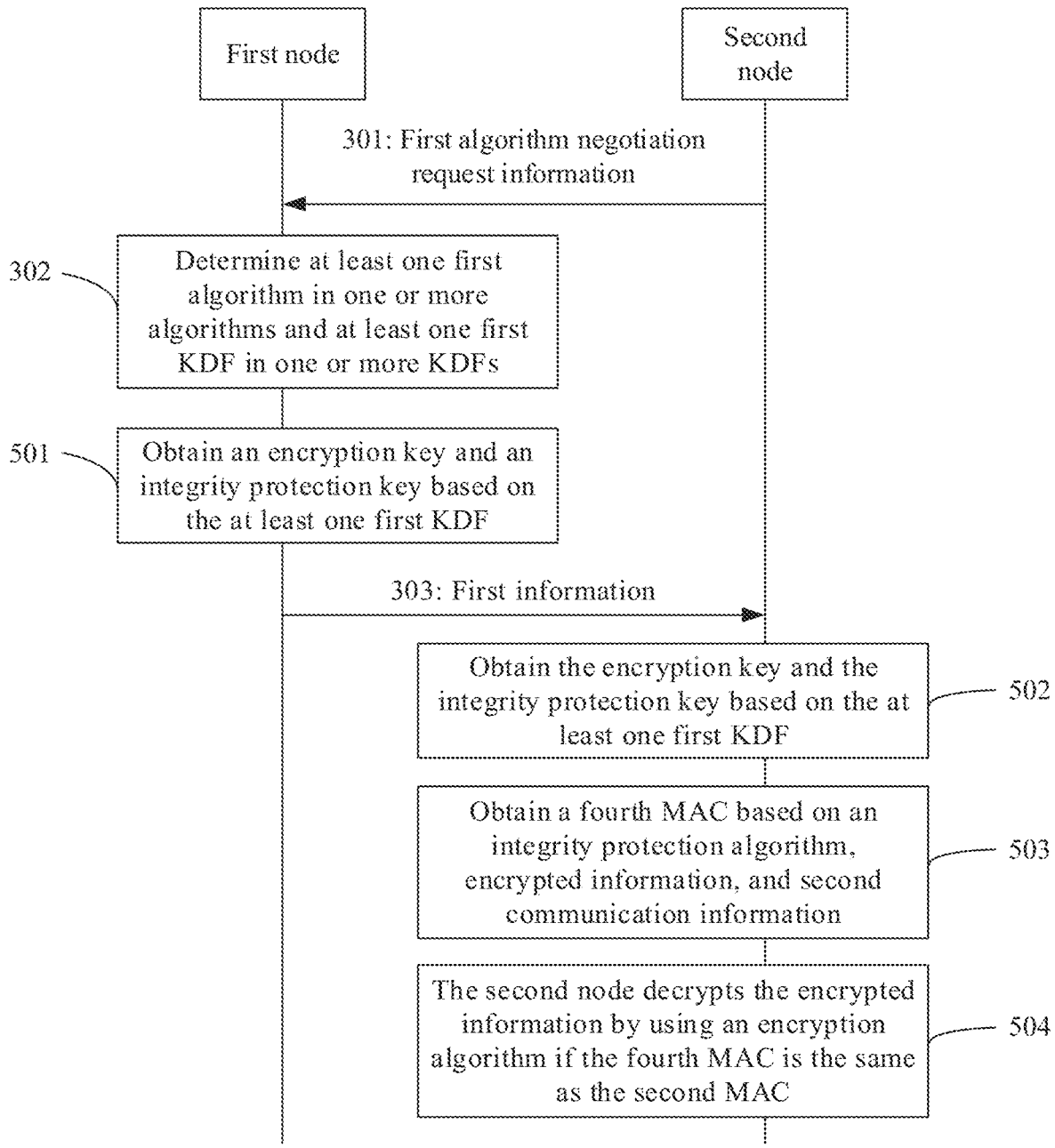
FIG. 5 is a schematic flowchart 3 of a communications method according to an embodiment of this application.

Optionally, in the second possible implementation of the method shown in FIG. 3, the first information includes the encrypted information, the second communication information, and the second MAC. When the at least one first algorithm includes an encryption algorithm and an integrity protection algorithm, the encrypted information is obtained by encrypting the first communication information by using the encryption algorithm, and the second MAC is obtained by performing integrity protection on the encrypted information and the second communication information by using the integrity protection algorithm. After receiving the first information, the second node may obtain the fourth MAC based on the integrity protection algorithm, the encrypted information, and the second communication information, and verify integrity of the first information by using the fourth MAC. Specifically, as shown in FIG. 5, the method shown in FIG. 3 further includes step 501 to step 504.

Step 501: The first node obtains an encryption key and an integrity protection key based on the at least one first KDF.

The encryption key may be used to encrypt the first communication information, or the encryption key may be used to decrypt the encrypted information. The integrity protection key may be used to perform integrity protection on the second communication information and the encrypted information, or the integrity protection key may be used to verify integrity of the second communication information and the encrypted information.

The first node may obtain the encryption key and the integrity protection key in any one of the following manners.

Manner 4.1: The first node uses a shared key as input of the first KDF to obtain the encryption key and the integrity protection key, that is, $K_{enc}$=first KDF(K), and $K_{int}$=first KDF(K), where $K_{enc}$ is the encryption key, K is the shared key, and $K_{int}$ is the integrity protection key.

Manner 4.2: The first node uses a shared key and the second fresh parameter as input of the first KDF to obtain the encryption key and the integrity protection key, that is, $K_{enc}$=first KDF(K, C), and $K_{int}$=first KDF(K, C), where $K_{enc}$ is the encryption key, K is the shared key, C is the second fresh parameter, and $K_{int}$ is the integrity protection key.

Manner 4.3: The first node uses a shared key, the second fresh parameter, and a second character string as input of the first KDF to obtain the encryption key, that is, $K_{enc}$=first KDF(K, C, second character string). The first node uses the shared key, the second fresh parameter, and a third character string as input of the first KDF to obtain the integrity protection key, that is, $K_{int}$=first KDF(K, C, third character string). Herein, $K_{enc}$ is the encryption key, K is the shared key, C is the second fresh parameter, and $K_{int}$ is the integrity protection key. The second character string may be used to identify an encryption algorithm. For example, when the at least one first algorithm is a signaling plane encryption algorithm, the second character string may be "signalling enc". The third character string may be used to identify an integrity protection algorithm. For example, when the at least one first algorithm is a signaling plane integrity protection algorithm, the third character string may be "signalling int".

Manner 4.4: The first node uses a shared key, the second fresh parameter, a second character string, and a second identifier as input of the first KDF to obtain the encryption key, that is, $K_{enc}$=first KDF(K, C, second character string, second identifier). The first node uses the shared key, the second fresh parameter, a third character string, and a third identifier as input of the first KDF to obtain the integrity protection key, that is, $K_{int}$=first KDF(K, C, third character string, third identifier). Herein, $K_{enc}$ is the encryption key, K is the shared key, C is the second fresh parameter, and $K_{int}$ is the integrity protection key. For descriptions of the second character string and the third character string, refer to the descriptions in the foregoing Manner 3.3. Details are not described again. The second identifier may be used to identify a KDF used to generate the encryption key. For example, the second identifier may be an identifier of a first KDF used to generate the encryption key. The third identifier may be used to identify a KDF used to generate the integrity protection key. For example, the third identifier may be an identifier of a first KDF used to generate the integrity protection key.

It may be understood that the second identifier or the third identifier may include a number and/or a character. The second character string and the third character string in Manner 4.4 may be optional parameters.

Manner 4.5: The first node obtains a second intermediate key based on a shared key and the second fresh parameter; and the first node obtains the encryption key based on the second intermediate key and at least one of a second identifier and a second character string. For example, the first node uses the shared key and the second fresh parameter as input of a KDF 3 to obtain the second intermediate key, that is, $K_{mid2}$=KDF 1(K, C). The first node uses the second intermediate key, the second identifier, and the second character string as input of a KDF 4 to obtain the encryption key, that is, $K_{enc}$=KDF 2($K_{mid2}$, second identifier, second character string). The first node obtains a third intermediate key based on the shared key and the second fresh parameter; and the first node obtains the integrity protection key based on the third intermediate key and at least one of a third identifier and a third character string. For example, the first node uses the shared key and the second fresh parameter as input of a KDF 5 to obtain the third intermediate key, that is, $K_{mid3}$=KDF 1(K, C). The first node uses the third intermediate key, the third identifier, and the third character string as input of a KDF 6 to obtain the integrity protection key, that is, $K_{int}$=KDF 2($K_{mid3}$, third identifier, third character string).

Herein, $K_{mid2}$ is the second intermediate key, K is the shared key, C is the second fresh parameter, $K_{enc}$ is the encryption key, $K_{mid3}$ is the third intermediate key, and $K_{int}$ is the integrity protection key. For descriptions of the second character string and the third character string, refer to the descriptions in the foregoing Manner 4.3. For descriptions of the second identifier and the third identifier, refer to the descriptions in the foregoing Manner 4.4. Details are not described again.

The KDF 3, the KDF 4, the KDF 5, and the KDF 6 may be included in the at least one first KDF. The KDF 3 and the KDF 4 may be the same or different. The KDF 5 and the KDF 6 may be the same or different.

It may be understood that, to more clearly describe the solution, how to obtain the encryption key and the integrity protection key is explained in two steps herein. In actual processing, the encryption key and the integrity protection key may alternatively be obtained in one step. The second intermediate key and the third intermediate key are only intermediate results. To be specific, a manner of determining the encryption key satisfies: $K_{enc}$=KDF 4(KDF 3(K, C), second algorithm, second character string), and a manner of determining the integrity protection key satisfies: $K_{int}$=KDF 6(KDF 5(K, C), third algorithm, third character string).

Optionally, the shared key in the foregoing manner is preset in the first node, or the shared key in the foregoing manner is obtained by the first node through calculation before step 501.

Optionally, in the foregoing manner, the first KDF for generating the encryption key is the same as or different from the first KDF for generating the integrity protection key. For example, the at least one first KDF includes one KDF, and the first KDF for generating the encryption key is the same as the first KDF for generating the integrity protection key; or the at least one first KDF includes a plurality of KDFs, and the first KDF for generating the encryption key is different from the first KDF for generating the integrity protection key.

Further, the second MAC is obtained based on the integrity protection algorithm, the encrypted information, the second communication information, and the integrity protection key. For example, the first node obtains the second MAC by using the encrypted information, the second communication information, and the integrity protection key as input of the integrity protection algorithm.

Step 502: The second node obtains the encryption key and the integrity protection key based on the at least one first KDF.

For a specific process in which the second node obtains the encryption key and the integrity protection key based on the at least one first KDF, refer to the corresponding descriptions in step 501 in which the first node obtains the encryption key and the integrity protection key based on the at least one first KDF. Details are not described again.

Step 503: The second node obtains the fourth MAC based on the integrity protection algorithm, the encrypted information, and the second communication information.

Further, the second node obtains the fourth MAC based on the integrity protection algorithm, the encrypted information, the second communication information, and the integrity protection key. For example, the second node obtains the fourth MAC by using the encrypted information, the second communication information, and the integrity protection key as input of the integrity protection algorithm.

It may be understood that the second node may further perform integrity protection on the encrypted information and some information in the second communication information. For example, the second node obtains the fourth MAC based on the encrypted information, the some information in the second communication information, the integrity protection algorithm, and the integrity protection key.

Step 504: The second node decrypts the encrypted information by using the encryption algorithm if the fourth MAC is the same as the second MAC.

Optionally, if the fourth MAC is the same as the second MAC, it indicates that the first communication information is not modified, and the second node decrypts the encrypted information by using the encryption key, to obtain the first communication information.

Optionally, if the fourth MAC is different from the second MAC, it indicates that the first communication information is modified, and the second node discards the first information. The second node may perform step 301 again, or the second node may indicate the first node to re-determine the at least one first algorithm and the at least one first KDF.

It may be understood that when the first communication information includes the indication information used to indicate one or more algorithms and one or more KDFs, after obtaining the first communication information, the second node may further verify whether the one or more algorithms and the one or more KDFs included in the first communication information are the same as the one or more algorithms and the one or more KDFs included in the first algorithm negotiation request information. If the one or more algorithms and the one or more KDFs included in the first communication information are the same as the one or more algorithms and the one or more KDFs included in the first algorithm negotiation request information, it indicates that the first algorithm negotiation request information is not modified, and a communication environment of the first node and the second node is secure. If the one or more algorithms and the one or more KDFs included in the first communication information are different from the one or more algorithms and the one or more KDFs included in the first algorithm negotiation request information, it indicates that the first algorithm negotiation request information is modified, and a communication environment of the first node and the second node is insecure.

It may be understood that, when the first communication information includes the first verification information, after obtaining the first communication information, the second node verifies, by using the first verification information, whether the first algorithm negotiation request information is modified. If the first algorithm negotiation request information is not modified, a communication environment of the first node and the second node is secure; or if the first algorithm negotiation request information is modified, a communication environment of the first node and the second node is insecure.

Based on the method shown in FIG. 5, when the at least one first algorithm includes the encryption algorithm and the integrity protection algorithm, the first node and the second node may obtain the encryption key and the integrity protection key based on the at least one first KDF. Subsequently, the first node may encrypt the first communication information by using the encryption key to obtain the encrypted information, obtain the second MAC based on the integrity protection algorithm, the encrypted information, the second communication information, and the integrity protection key, and perform integrity protection on the first information by using the second MAC. The second node may obtain the fourth MAC based on the integrity protection algorithm, the encrypted information, the second communication information, and the integrity protection key, and verify integrity of the first information by using the fourth MAC. In this way, when the first node communicates with the second node, the first communication information may be encrypted by using the encryption algorithm, and integrity protection may be further performed on the first information by using the integrity protection algorithm. Therefore, security of communication between the first node and the second node can be improved.

Figure 6:
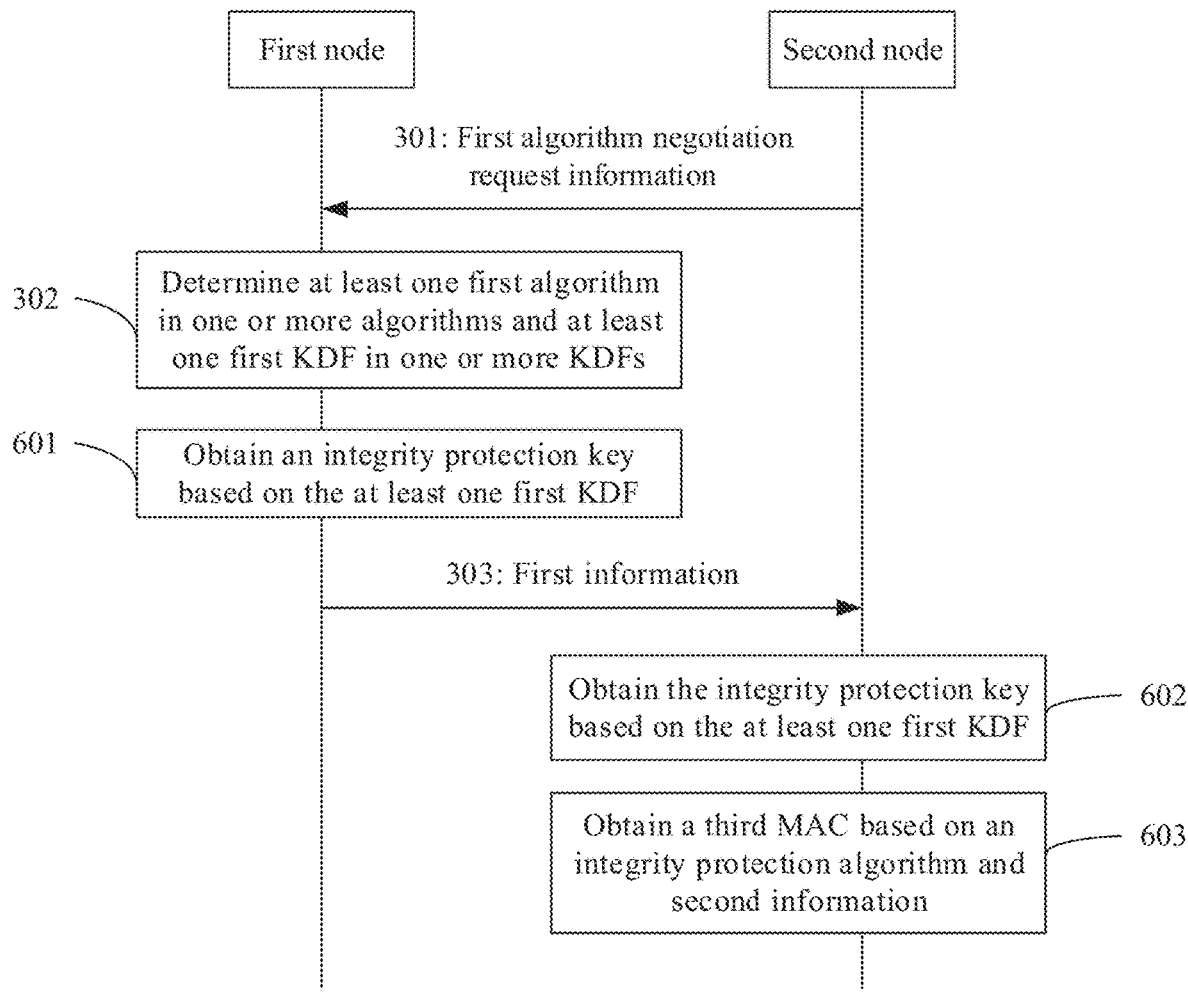
FIG. 6 is a schematic flowchart 4 of a communications method according to an embodiment of this application.

Optionally, in the third possible implementation of the method shown in FIG. 3, the first information includes the second information and the first MAC. When the at least one first algorithm includes an encryption algorithm and an integrity protection algorithm, the first MAC is obtained by performing integrity protection on the second information by using the integrity protection algorithm. After receiving the first information, the second node may obtain the third MAC based on the integrity protection algorithm, the second information, and the integrity protection key, and verify integrity of the first information by using the third MAC. Specifically, as shown in FIG. 6, the method shown in FIG. 3 further includes step 601 to step 603.

Step 601: The first node obtains an integrity protection key based on the at least one first KDF.

For a specific process of step 601, refer to the corresponding descriptions in step 501. Details are not described again.

Further, the first MAC is obtained based on the integrity protection algorithm, the second information, and the integrity protection key. For example, the first node obtains the first MAC by using the second information and the integrity protection key as input of the integrity protection algorithm.

Optionally, the first node obtains an encryption key based on the at least one first KDF such that the first node and the second node subsequently encrypt or decrypt communication information between the first node and the second node by using the encryption key. This improves security of communication between the first node and the second node. For a process in which the first node obtains the encryption key based on the at least one first KDF, refer to the corresponding descriptions in step 501. Details are not described again.

Step 602: The second node obtains the integrity protection key based on the at least one first KDF.

For a specific process of step 602, refer to the corresponding descriptions in step 502. Details are not described again.

Optionally, the second node obtains the encryption key based on the at least one KDF. For a process in which the second node obtains the encryption key based on the at least one first KDF, refer to the corresponding descriptions in step 502. Details are not described again.

Step 603: The second node obtains the third MAC based on the integrity protection algorithm and the second information.

The third MAC may be used to verify integrity of the second information.

Further, the second node obtains the third MAC based on the integrity protection algorithm, the second information, and the integrity protection key. For example, the second node obtains the third MAC by using the second information and the integrity protection key as input of the integrity protection algorithm.

It may be understood that the second node may further perform integrity protection on some information in the second information. For example, the second node obtains the third MAC based on the some information in the second information, the integrity protection algorithm, and the integrity protection key.

It should be noted that if the third MAC is the same as the first MAC, it indicates that the second information is not modified, and the second node and the first node may communicate with each other by using the at least one first algorithm and the at least one first KDF. If the third MAC is different from the first MAC, it indicates that the first information is modified, and the second node may perform step 301 again, or the second node may indicate the first node to re-determine the at least one first algorithm and the at least one first KDF.

It may be understood that when the first communication information includes the indication information used to indicate one or more algorithms and one or more KDFs, after obtaining the first communication information, the second node may further verify whether the one or more algorithms and the one or more KDFs included in the first communication information are the same as the one or more algorithms and the one or more KDFs included in the first algorithm negotiation request information. If the one or more algorithms and the one or more KDFs included in the first communication information are the same as the one or more algorithms and the one or more KDFs included in the first algorithm negotiation request information, it indicates that the first algorithm negotiation request information is not modified, and a communication environment of the first node and the second node is secure. If the one or more algorithms and the one or more KDFs included in the first communication information are different from the one or more algorithms and the one or more KDFs included in the first algorithm negotiation request information, it indicates that the first algorithm negotiation request information is modified, and a communication environment of the first node and the second node is insecure.

It may be understood that, if the first communication information includes the first verification information, after obtaining the first communication information, the second node verifies, by using the first verification information, whether the first algorithm negotiation request information is modified. If the first algorithm negotiation request information is not modified, a communication environment of the first node and the second node is secure; or if the first algorithm negotiation request information is modified, a communication environment of the first node and the second node is insecure.

Based on the method shown in FIG. 6, when the at least one first algorithm includes the encryption algorithm and the integrity protection algorithm, the first node and the second node may obtain the encryption key and the integrity protection key based on the at least one first KDF. Subsequently, the first node may obtain the first MAC based on the integrity protection algorithm, the second information, and the integrity protection key, and perform integrity protection on the first information by using the first MAC. The second node may obtain the third MAC based on the integrity protection algorithm, the second information, and the integrity protection key, and verify integrity of the first information by using the third MAC. In this way, when the first node communicates with the second node, integrity protection may be performed on the first information by using the integrity protection algorithm. Therefore, security of communication between the first node and the second node can be improved.

Figure 7:
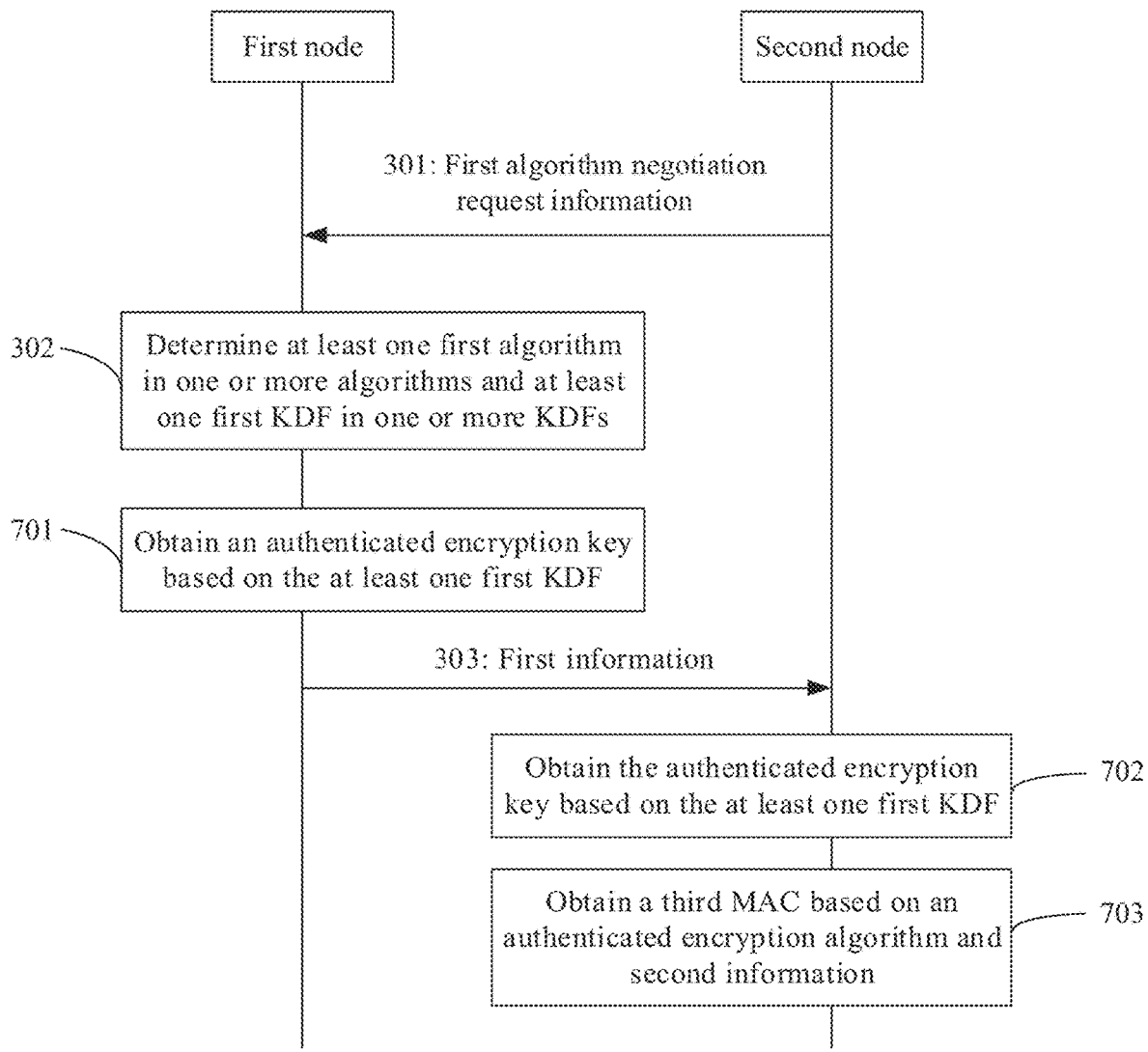
FIG. 7 is a schematic flowchart 5 of a communications method according to an embodiment of this application.

Optionally, in the fourth possible implementation of the method shown in FIG. 3, the first information includes the second information and the first MAC. When the at least one first algorithm includes an authenticated encryption algorithm, the first MAC is obtained by performing integrity protection on the second information by using the authenticated encryption algorithm. After receiving the first information, the second node may obtain the third MAC based on the authenticated encryption algorithm, the second information, and the authenticated encryption key, and verify integrity of the first information by using the third MAC. Specifically, as shown in FIG. 7, the method shown in FIG. 3 further includes step 701 to step 703.

Step 701: The first node obtains an authenticated encryption key based on the at least one first KDF.

For a specific process of step 701, refer to the corresponding descriptions in step 401. Details are not described again.

Further, the first MAC is obtained based on the authenticated encryption algorithm, the second information, and the authenticated encryption key. For example, the first node obtains the first MAC by using the second information and the authenticated encryption key as input of the authenticated encryption algorithm.

Step 702: The second node obtains the authenticated encryption key based on the at least one first KDF.

For a specific process of step 702, refer to the corresponding descriptions in step 402. Details are not described again.

Step 703: The second node obtains the third MAC based on the authenticated encryption algorithm and the second information.

The third MAC may be used to verify integrity of the second information.

Further, the second node obtains the third MAC based on the authenticated encryption algorithm, the second information, and the authenticated encryption key. For example, the second node obtains the third MAC by using the second information and the authenticated encryption key as input of the authenticated encryption algorithm.

It may be understood that the second node may further perform integrity protection on some information in the second information. For example, the second node obtains the third MAC based on the some information in the second information, the authenticated encryption algorithm, and the authenticated encryption key.

It should be noted that if the third MAC is the same as the first MAC, it indicates that the second information is not modified, and the second node and the first node may communicate with each other by using the at least one first algorithm and the at least one first KDF. If the third MAC is different from the first MAC, it indicates that the first information is modified, and the second node may perform step 301 again, or the second node may indicate the first node to re-determine the at least one first algorithm and the at least one first KDF.

It may be understood that for a case in which the first communication information includes the indication information used to indicate one or more algorithms and one or more KDFs, and a case in which the first communication information includes the first verification information, refer to the descriptions in the method in FIG. 6. Details are not described again.

Based on the method shown in FIG. 7, when the at least one first algorithm includes the authenticated encryption algorithm, the first node and the second node may obtain the authenticated encryption key based on the at least one first KDF. Subsequently, the first node may obtain the first MAC based on the authenticated encryption algorithm, the second information, and the authenticated encryption key, and perform integrity protection on the first information by using the first MAC. The second node may obtain the third MAC based on the authenticated encryption algorithm, the second information, and the authenticated encryption key, and verify integrity of the first information by using the third MAC. In this way, when the first node communicates with the second node, integrity protection may be performed on the first information by using the authenticated encryption algorithm. Therefore, security of communication between the first node and the second node can be improved.

It may be understood that before step 301 of the method shown in FIG. 3, the method shown in FIG. 4, the method shown in FIG. 5, or the method shown in FIG. 6, the second node may send indication information of one or more algorithms and one or more KDFs to the first node a plurality of times, so that the first node determines the at least one first algorithm and the at least one first KDF from the indication information sent a plurality of times. The following describes the foregoing process by using the method shown in FIG. 3 as an example.

Figure 8:
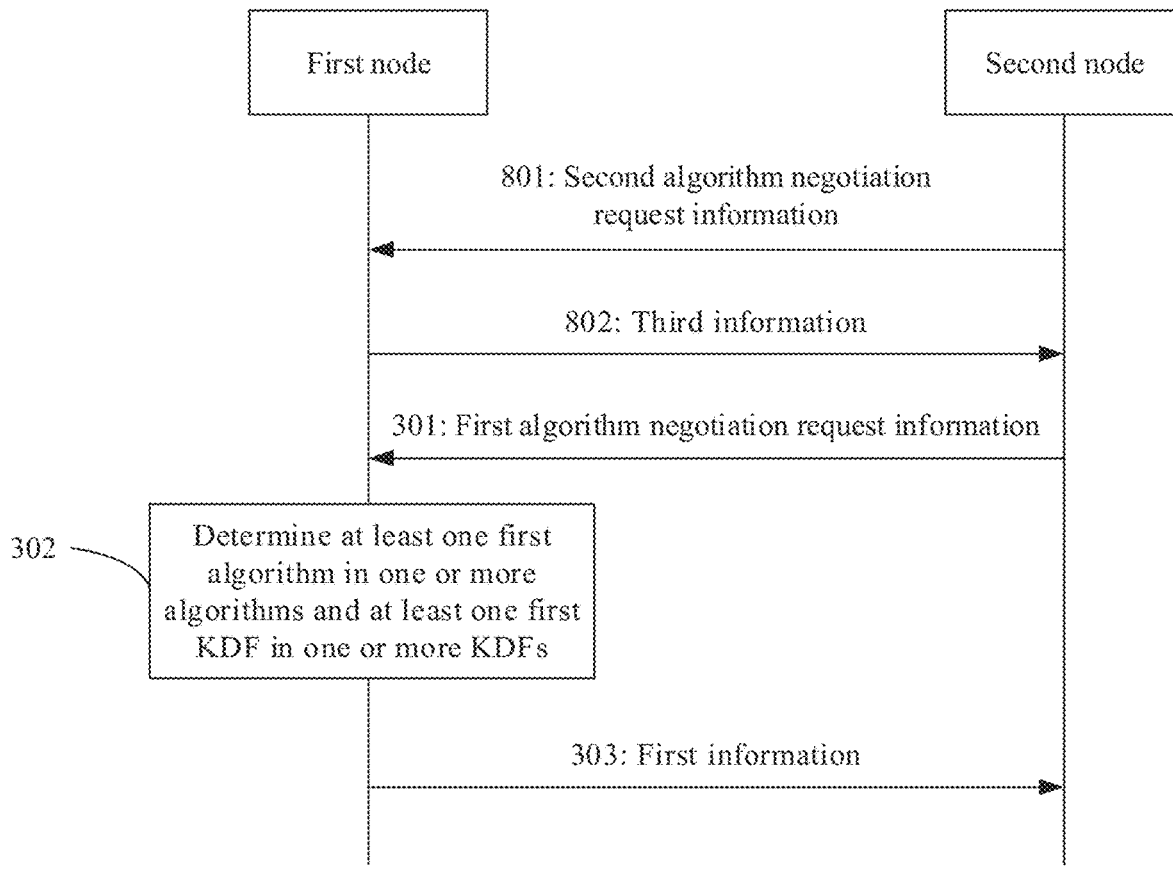
FIG. 8 is a schematic flowchart 6 of a communications method according to an embodiment of this application.

Optionally, as shown in FIG. 8, in a fifth possible implementation of the method shown in FIG. 3, the method shown in FIG. 3 further includes step 801 and step 802.

Step 801: The second node sends second algorithm negotiation request information to the first node.

The second algorithm negotiation request information may be used to indicate one or more algorithms and one or more KDFs.

Optionally, the one or more algorithms indicated by the second algorithm negotiation request information are different from the one or more algorithms indicated by the first algorithm negotiation request information. For example, the one or more algorithms indicated by the second algorithm negotiation request information are completely different from the one or more algorithms indicated by the first algorithm negotiation request information. Alternatively, the one or more algorithms indicated by the second algorithm negotiation request information are not completely the same as the one or more algorithms indicated by the first algorithm negotiation request information. The one or more KDFs indicated by the second algorithm negotiation request information are different from the one or more KDFs indicated by the first algorithm negotiation request information. For example, the one or more KDFs indicated by the second algorithm negotiation request information are completely different from the one or more KDFs indicated by the first algorithm negotiation request information. Alternatively, the one or more KDFs indicated by the second algorithm negotiation request information are not completely the same as the one or more KDFs indicated by the first algorithm negotiation request information.

Optionally, the second algorithm negotiation request information further includes the identifier of the second node and a third fresh parameter. The identifier of the second node may be used to identify the second node. The third fresh parameter is a parameter related to time validity of the second algorithm negotiation request information. For example, the third fresh parameter includes a value of a counter in the second node or a third nonce. The value of the counter may be a value that is of the counter of the second node and that exists when the second node determines to send the second algorithm negotiation request information, and the counter may be used to record a quantity of times of communication between the first node and the second node. The third nonce may be a nonce generated by the second node when the second node determines to send the second algorithm negotiation request information.

For a specific process of step 801, refer to the corresponding descriptions in step 301 in which the second node sends the first algorithm negotiation request information to the first node. Details are not described again.

Step 802: The first node receives the second algorithm negotiation request information from the second node, and sends third information to the second node.

The third information may be used to indicate that the one or more algorithms and the one or more KDFs indicated by the second algorithm negotiation request information are not supported or are not applicable.

It may be understood that when the first node indicates that the one or more algorithms and the one or more KDFs indicated by the second node are not supported or are not applicable, the second node may perform step 801 again, until the first node determines the at least one first algorithm and the at least one first KDF based on one or more algorithms and one or more KDFs indicated by the second node.

It may be understood that, in addition to being performed before step 301 in the method shown in FIG. 3, step 801 and step 802 may also be performed before step 301 in the method shown in FIG. 4, FIG. 5, FIG. 6, or FIG. 7. This is not limited.

Based on the method shown in FIG. 8, before the first node determines the at least one first algorithm and the at least one first KDF, the second node may send indication information of one or more algorithms and one or more KDFs to the first node a plurality of times. In this way, the second node may negotiate, by sending the indication information of the one or more algorithms and the one or more KDFs to the first node a plurality of times, with the first node for an algorithm and a KDF that are to be used between the first node and the second node.

The solutions provided in the embodiments of this application are mainly described above from a perspective of interaction between the first node and the second node. It may be understood that, to implement the foregoing functions, the first node or the second node includes corresponding hardware structures and/or software modules for performing the functions. A person skilled in the art should be easily aware that, in combination with the examples of units and algorithm operations described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first node or the second node may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into modules is an example, and is merely logical function division. During actual implementation, there may be another division manner.

Figure 9:
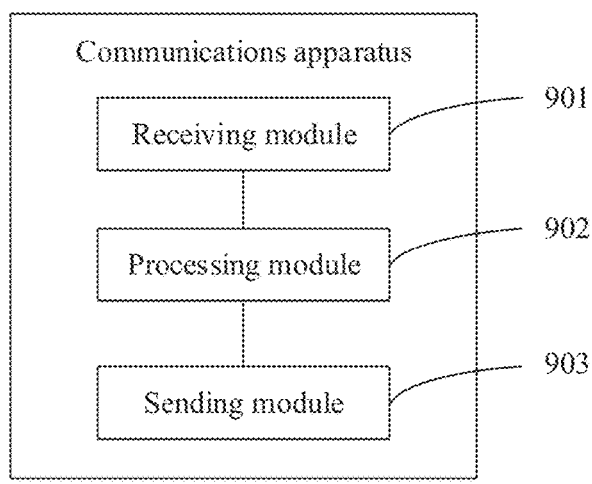
FIG. 9 is a schematic structural diagram 1 of a communications apparatus according to an embodiment of this application.

For example, when each functional module is obtained through division in an integration manner, FIG. 9 is a schematic structural diagram of a communications apparatus. The communications apparatus may be a first node, or a chip or a system on chip in the first node, and the communications apparatus may be configured to perform a function of the first node in the foregoing embodiments.

In a possible implementation, the communications apparatus shown in FIG. 9 includes a receiving module 901, a processing module 902, and a sending module 903.

The receiving module 901 is configured to receive first algorithm negotiation request information from a second node, where the first algorithm negotiation request information is used to indicate one or more algorithms and one or more KDFs.

The processing module 902 is configured to determine at least one first algorithm in the one or more algorithms and at least one first KDF in the one or more KDFs.

The sending module 903 is configured to send first information to the second node, where the first information is used to indicate the at least one first algorithm and the at least one first KDF.

Optionally, the one or more algorithms include an encryption algorithm, and/or an integrity protection algorithm, and/or an authenticated encryption algorithm.

Optionally, integrity protection is performed on the first information by using the at least one first algorithm.

Optionally, the first information includes second information and a first message authentication code MAC, the second information is used to indicate the at least one first algorithm and the at least one first KDF, and the first MAC is obtained by performing integrity protection on the second information.

Optionally, the at least one first algorithm includes an integrity protection algorithm, and the first MAC is obtained by performing integrity protection on the second information by using the integrity protection algorithm; or the at least one first algorithm includes the authenticated encryption algorithm, and the first MAC is obtained by performing integrity protection on the second information by using the authenticated encryption algorithm.

Optionally, the second information further includes a first fresh parameter and first verification information, the first fresh parameter is a parameter related to time validity of the first information, and the first verification information is obtained based on the first algorithm negotiation request information, a preset shared key, the first fresh parameter, and the first KDF.

Optionally, the first information includes encrypted information, second communication information, and a second message authentication code MAC; the encrypted information is obtained by encrypting first communication information, the first communication information does not indicate at least one of the at least one first algorithm or the at least one first KDF, and the second communication information is used to indicate at least one of the at least one first algorithm or the at least one first KDF; and the second MAC is obtained by performing integrity protection on the encrypted information and the second communication information.

Optionally, the at least one first algorithm includes an encryption algorithm and an integrity protection algorithm; the encrypted information is obtained by encrypting the first communication information by using the encryption algorithm; and the second MAC is obtained by performing integrity protection on the encrypted information and the second communication information by using the integrity protection algorithm.

Optionally, the at least one first algorithm includes an authenticated encryption algorithm; the encrypted information is obtained by encrypting the first communication information by using the authenticated encryption algorithm; and the second MAC is obtained by performing integrity protection on the encrypted information and the second communication information by using the authenticated encryption algorithm.

Optionally, the at least one first algorithm is an algorithm that is supported by the communications apparatus and that has a highest priority in the one or more algorithms, and the at least one first KDF is a KDF that is supported by the communications apparatus and that has a highest priority in the one or more KDFs.

Optionally, the first algorithm negotiation request information further includes a second fresh parameter, and the second fresh parameter is a parameter related to time validity of the first algorithm negotiation request information; the receiving module 901 is further configured to receive second verification information from the second node, where the second verification information is obtained based on the first information, the preset shared key, the second fresh parameter, and the first KDF; and the processing module 902 is further configured to verify the second verification information based on the first information, the preset shared key, the second fresh parameter, and the first KDF.

Optionally, the receiving module 901 is further configured to receive second algorithm negotiation request information from the second node, where the second algorithm negotiation request information is used to indicate one or more algorithms and one or more KDFs; and the sending module 903 is further configured to send third information to the second node, where the third information is used to indicate that the one or more algorithms and the one or more KDFs indicated by the second algorithm negotiation request information are not supported or are not applicable.

Optionally, the one or more algorithms indicated by the second algorithm negotiation request information are different from the one or more algorithms indicated by the first algorithm negotiation request information; and the one or more KDFs indicated by the second algorithm negotiation request information are different from the one or more KDFs indicated by the first algorithm negotiation request information.

All related content of the operations in the foregoing method embodiments may be cited in function description of the corresponding functional modules. Details are not described herein.

In this embodiment, the communications apparatus is presented in a form of the functional modules obtained through division in an integration manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communications apparatus may be in a form shown in FIG. 2.

For example, the processor 201 in FIG. 2 may invoke the computer-executable instructions stored in the memory 203, to enable the communications apparatus to perform the communications method in the foregoing method embodiments.

For example, functions/implementation processes of the receiving module 901, the processing module 902, and the sending module 903 in FIG. 9 may be implemented by the processor 201 in FIG. 2 by invoking the computer-executable instructions stored in the memory 203. Alternatively, a function/an implementation process of the processing module 902 in FIG. 9 may be implemented by the processor 201 in FIG. 2 by invoking the computer-executable instructions stored in the memory 203, and functions/implementation processes of the receiving module 901 and the sending module 903 in FIG. 9 may be implemented by the communications interface 204 in FIG. 2.

The communications apparatus provided in this embodiment may be configured to perform the foregoing communications method. Therefore, for technical effects that can be achieved by the communications apparatus, refer to the foregoing method embodiments. Details are not described herein.

Figure 10:
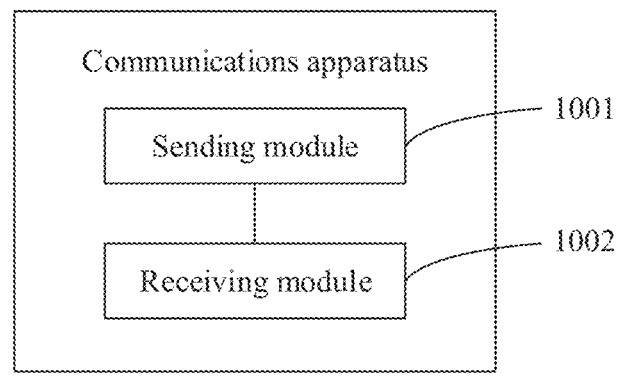
FIG. 10 is a schematic structural diagram 2 of a communications apparatus according to an embodiment of this application.

For example, when each functional module is obtained through division in an integration manner, FIG. 10 is a schematic structural diagram of a communications apparatus. The communications apparatus may be a second node, or a chip or a system on chip in the second node, and the communications apparatus may be configured to perform a function of the second node in the foregoing embodiments.

In a possible implementation, the communications apparatus shown in FIG. 10 includes a sending module 1001 and a receiving module 1002.

The sending module 1001 is configured to send first algorithm negotiation request information to a first node, where the first algorithm negotiation request information is used to indicate one or more algorithms and one or more KDFs.

The receiving module 1002 is configured to receive first information from the first node, where the first information is used to indicate at least one first algorithm in the one or more algorithms and at least one first KDF in the one or more KDFs.

Optionally, the one or more algorithms include an encryption algorithm, and/or an integrity protection algorithm, and/or an authenticated encryption algorithm.

Optionally, integrity protection is performed on the first information by using the at least one first algorithm.

Optionally, the first information includes second information and a first message authentication code MAC, the second information is used to indicate the at least one first algorithm and the at least one first KDF, and the first MAC is obtained by performing integrity protection on the second information.

Figure 11:
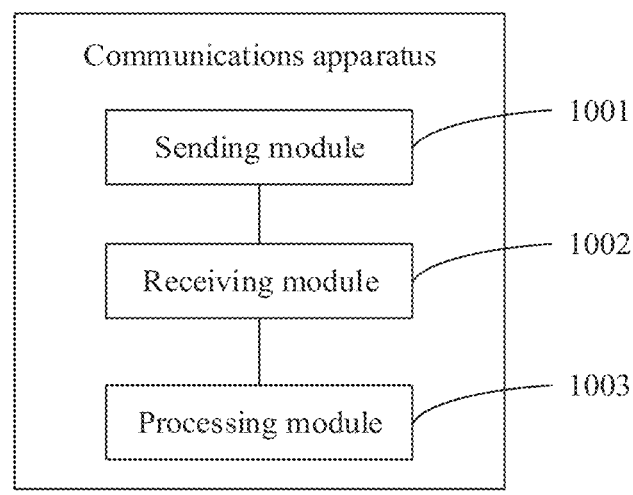
FIG. 11 is a schematic structural diagram 3 of a communications apparatus according to an embodiment of this application.

Optionally, as shown in FIG. 11, the communications apparatus further includes a processing module 1003; and the at least one first algorithm includes an integrity protection algorithm, the first MAC is obtained by performing integrity protection on the second information by using the integrity protection algorithm, and the processing module 1003 is configured to obtain a third MAC based on the integrity protection algorithm and the second information, where the third MAC is used to verify integrity of the second information; or the at least one first algorithm includes an authenticated encryption algorithm, the first MAC is obtained by performing integrity protection on the second information by using the authenticated encryption algorithm, and the processing module 1003 is configured to obtain a third MAC based on the authenticated encryption algorithm and the second information, where the third MAC is used to verify integrity of the second information.

Optionally, the second information further includes a first fresh parameter and first verification information, the first fresh parameter is a parameter related to time validity of the first information, and the first verification information is obtained based on the first algorithm negotiation request information, a preset shared key, the first fresh parameter, and the first KDF.

Optionally, the first information includes encrypted information, second communication information, and a second message authentication code MAC; the encrypted information is obtained by encrypting first communication information, the first communication information does not indicate at least one of the at least one first algorithm or the at least one first KDF, and the second communication information is used to indicate at least one of the at least one first algorithm or the at least one first KDF; and the second MAC is obtained by performing integrity protection on the encrypted information and the second communication information.

Optionally, the at least one first algorithm includes an encryption algorithm and an integrity protection algorithm, and the encrypted information is obtained by encrypting the first communication information by using the encryption algorithm; the second MAC is obtained by performing integrity protection on the encrypted information and the second communication information by using the integrity protection algorithm; the processing module 1003 is configured to obtain a fourth MAC based on the integrity protection algorithm, the encrypted information, and the second communication information; and the processing module 1003 is further configured to decrypt the encrypted information by using the encryption algorithm if the fourth MAC is the same as the second MAC.

Optionally, the at least one first algorithm includes an authenticated encryption algorithm, and the encrypted information is obtained by encrypting the first communication information by using the authenticated encryption algorithm; the second MAC is obtained by performing integrity protection on the encrypted information and the second communication information by using the authenticated encryption algorithm; the processing module 1003 is configured to obtain a fourth MAC based on the authenticated encryption algorithm, the encrypted information, and the second communication information; and the processing module 1003 is further configured to decrypt the encrypted information by using the authenticated encryption algorithm if the fourth MAC is the same as the second MAC.

Optionally, the at least one first algorithm is an algorithm that is supported by the first node and that has a highest priority in the one or more algorithms, and the at least one first KDF is a KDF that is supported by the first node and that has a highest priority in the one or more KDFs.

Optionally, the first algorithm negotiation request information further includes a second fresh parameter, the second fresh parameter is a parameter related to time validity of the first algorithm negotiation request information, and the sending module 1001 is further configured to send second verification information to the first node, where the second verification information is obtained based on the first information, the preset shared key, the second fresh parameter, and the first KDF.

Optionally, the sending module 1001 is further configured to send second algorithm negotiation request information to the first node, where the second algorithm negotiation request information is used to indicate one or more algorithms and one or more KDFs; and the receiving module 1002 is further configured to receive third information from the first node, where the third information is used to indicate that the one or more algorithms and the one or more KDFs indicated by the second algorithm negotiation request information are not supported or are not applicable.

Optionally, the one or more algorithms indicated by the second algorithm negotiation request information are different from the one or more algorithms indicated by the first algorithm negotiation request information; and the one or more KDFs indicated by the second algorithm negotiation request information are different from the one or more KDFs indicated by the first algorithm negotiation request information.

All related content of the operations in the foregoing method embodiments may be cited in function description of the corresponding functional modules. Details are not described herein.

In this embodiment, the communications apparatus is presented in a form of the functional modules obtained through division in an integration manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communications apparatus may be in a form shown in FIG. 2.

For example, the processor 201 in FIG. 2 may invoke the computer-executable instructions stored in the memory 203, to enable the communications apparatus to perform the communications method in the foregoing method embodiments.

For example, functions/implementation processes of the sending module 1001, the receiving module 1002, and the processing module 1003 in FIG. 11 may be implemented by the processor 201 in FIG. 2 by invoking the computer-executable instructions stored in the memory 203. Alternatively, a function/an implementation process of the processing module 1003 in FIG. 11 may be implemented by the processor 201 in FIG. 2 by invoking the computer-executable instructions stored in the memory 203, and functions/implementation processes of the sending module 1001 and the receiving module 1002 in FIG. 11 may be implemented by the communications interface 204 in FIG. 2.

The communications apparatus provided in this embodiment may be configured to perform the foregoing communications method. Therefore, for technical effects that can be achieved by the communications apparatus, refer to the foregoing method embodiments. Details are not described herein.

Figure 12:
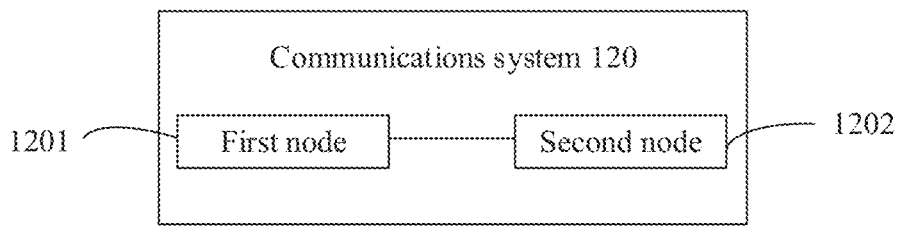
FIG. 12 is a schematic composition diagram of a communications system according to an embodiment of this application.

FIG. 12 is a schematic composition diagram of a communications system. As shown in FIG. 12, the communications system 120 may include a node 1201 and a node 1202. It should be noted that FIG. 12 is merely an example accompanying drawing, and nodes included in the communications system 120 shown in FIG. 12 and a quantity of nodes are not limited in this embodiment of this application.

The node 1201 has a function of the communications apparatus shown in FIG. 9, and is configured to: receive first algorithm negotiation request information from a second node, determine at least one first algorithm in the one or more algorithms and at least one first KDF in the one or more KDFs, and send first information to the second node.

The node 1202 has a function of the communications apparatus shown in FIG. 10 or FIG. 11, and may be configured to: send first algorithm negotiation request information to a first node, and receive first information from the first node.

It should be noted that all related content of the steps in the foregoing method embodiments may be cited in function description of corresponding nodes of the communications system 120. Details are not described herein.

Figure 13:
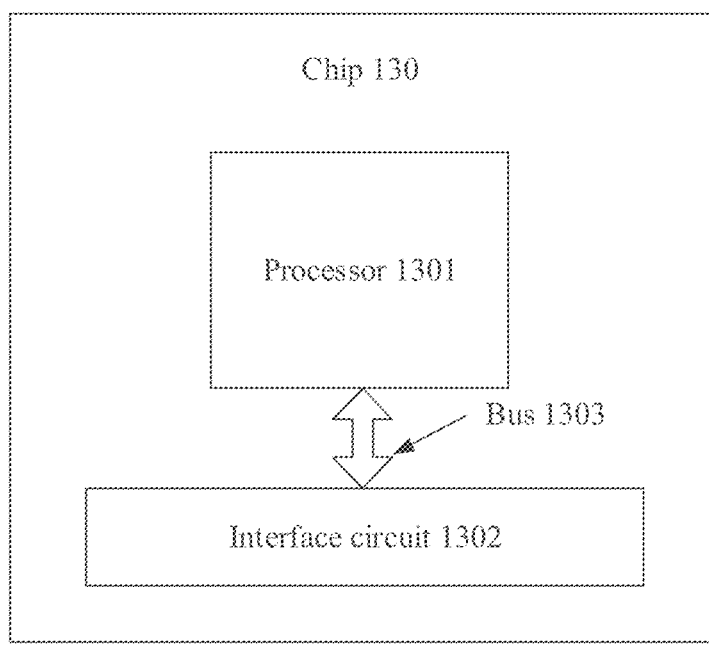
FIG. 13 is a schematic structural diagram of a chip according to an embodiment of this application.

FIG. 13 is a schematic structural diagram of a chip according to an embodiment of this application. The chip 130 includes one or more processors 1301 and an interface circuit 1302. Optionally, the chip 130 may further include a bus 1303.

The processor 1301 may be an integrated circuit chip and has a signal processing capability. In an implementation process, steps in the foregoing methods can be implemented by using a hardware integrated logic circuit in the processor 1301 or by using instructions in a form of software. The processor 1301 may be a general-purpose processor, a digital signal processor (DSP), an ASIC, a FPGA or another programmable logic device, a discrete gate or a transistor logic device, or a discrete hardware component. The processor may implement or perform the methods and steps that are disclosed in the embodiments of this application. The general-purpose processor may be a microprocessor, or the processor may be any conventional processor or the like.

The interface circuit 1302 is configured to send or receive data, instructions, or information. The processor 1301 may perform processing by using the data, the instructions, or other information received by the interface circuit 1302, and may send processed information by using the interface circuit 1302.

Optionally, the chip 130 further includes a memory. The memory may include a ROM and a RAM, and provide operation instructions and data for the processor. A part of the memory may further include a non-volatile RAM (NVRAM).

Optionally, the memory stores an executable software module or a data structure, and the processor may perform a corresponding operation by invoking an operation instruction (the operation instruction may be stored in an operating system) stored in the memory.

Optionally, the chip 130 may be used in the communications apparatus (including the first node and the second node) in the embodiments of this application. Optionally, the interface circuit 1302 may be configured to output an execution result of the processor 1301. For the communications method provided in one or more embodiments of this application, refer to the foregoing embodiments. Details are not described herein again.

It should be noted that functions corresponding to the processor 1301 and the interface circuit 1302 may be implemented by using a hardware design, or may be implemented by using a software design, or may be implemented by combining software and hardware. This is not limited herein.

An embodiment of this application further provides a smart cockpit product, and the smart cockpit product includes the foregoing first node and/or the foregoing second node.

An embodiment of this application further provides an intelligent device or a transportation vehicle, and the vehicle includes a first node and/or a second node. Specifically, the intelligent device may be a robot or the like, and the transportation vehicle may be a smart car, an unmanned aerial vehicle, an unmanned transportation vehicle, or the like.

The foregoing descriptions about implementations allow a person skilled in the art to clearly understand that, for the purpose of convenient and brief description, division into only the foregoing functional modules is used as an example for illustration. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples.

For example, division into the modules or units is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in the embodiments of this application may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a first node, comprising:
    receiving, from a second node, first algorithm negotiation request information indicating one or more algorithms and one or more key derivation functions (KDFs);
    determining a first algorithm in the one or more algorithms and a first KDF in the one or more KDFs;
    sending, to the second node, first information indicating the first algorithm and the first KDF, wherein the first information comprises a fresh parameter related to time validity of the first information;
    receiving, from the second node, first verification information, wherein the first verification information is based on the first information, a preset shared key, the fresh parameter, and the first KDF; and
    verifying the first verification information.

2. The method of claim 1, wherein the one or more algorithms comprise an encryption algorithm, an integrity protection algorithm, or an authenticated encryption algorithm.

3. The method of claim 2, further comprising performing integrity protection on the first information using the first algorithm.

4. The method of claim 2, wherein the first information comprises second information and a first message authentication code (MAC), wherein the second information indicates the first algorithm and the first KDF, and wherein the method further comprises performing integrity protection on the second information to obtain the first MAC.

5. The method of claim 4, wherein the first algorithm comprises the authenticated encryption algorithm, and wherein the method further comprises further performing the integrity protection on the second information using the authenticated encryption algorithm to obtain the first MAC.

6. The method of claim 4, wherein the first algorithm comprises the integrity protection algorithm, and wherein the method further comprises further performing the integrity protection on the second information using the integrity protection algorithm to obtain the first MAC.

7. The method of claim 1, wherein the first algorithm is supported by the first node and has a first highest priority in the one or more algorithms, and wherein the first KDF is supported by the first node and has a second highest priority in the one or more KDFs.

8. The method of claim 1, wherein the fresh parameter comprises a value of a counter in the first node.

9. A method implemented by a second node, wherein the method comprises:
    sending, to a first node, first algorithm negotiation request information indicating one or more algorithms and one or more key derivation functions (KDFs);
    receiving, from the first node, first information indicating a first algorithm in the one or more algorithms and a first KDF in the one or more KDFs, wherein the first information comprises a fresh parameter related to time validity of the first information;
    obtaining first verification information based on the first information, a preset shared key, the fresh parameter, and the first KDF; and
    sending the first verification information to the first node.

10. The method of claim 9, wherein the one or more algorithms comprise an encryption algorithm, an integrity protection algorithm, or an authenticated encryption algorithm.

11. The method of claim 10, wherein integrity protection is performed on the first information using the first algorithm.

12. The method of claim 10, wherein the first information comprises second information and a first message authentication code (MAC) wherein the second information indicates the first algorithm and the first KDF, and wherein the first MAC is obtained by performing integrity protection on the second information.

13. The method of claim 12, wherein the first algorithm comprises the integrity protection algorithm, wherein the first MAC is obtained by performing integrity protection on the second information using the integrity protection algorithm, wherein the method further comprises obtaining a third MAC based on the integrity protection algorithm and the second information, and wherein the third MAC verifies integrity of the second information.

14. The method of claim 12, wherein the first algorithm comprises the authenticated encryption algorithm, wherein the first MAC is obtained by performing integrity protection on the second information using the authenticated encryption algorithm, wherein the method further comprises obtaining a fourth MAC based on the authenticated encryption algorithm and the second information, and wherein the fourth MAC verifies integrity of the second information.

15. The method of claim 9, wherein the first algorithm is supported by the first node and has a first highest priority in the one or more algorithms, and wherein the first KDF is supported by the first node and has a second highest priority in the one or more KDFs.

16. The method of claim 9, wherein the fresh parameter comprises a value of a counter in the first node.

17. A communications apparatus comprising:
a memory configured to store instructions; and
a processor coupled to the memory and configured to:
receive, from a second node, first algorithm negotiation request information indicating one or more algorithms and one or more key derivation functions (KDFs);
determine a first algorithm in the one or more algorithms and a first KDF in the one or more KDFs;
send, to the second node, first information indicating the first algorithm and the first KDF, wherein the first information comprises a fresh parameter related to time validity of the first information;
receive, from the second node, first verification information, wherein the first verification information is based on the first information, a preset shared key, the fresh parameter, and the first KDF; and
verify the first verification information.

18. The communications apparatus of claim 17, wherein the one or more algorithms comprise an encryption algorithm, an integrity protection algorithm, or an authenticated encryption algorithm.

19. The communications apparatus of claim 18, wherein the processor is further configured to perform integrity protection on the first information using the first algorithm.

20. The communications apparatus of claim 18, wherein the first information comprises second information and a first message authentication code (MAC), wherein the second information indicates the first algorithm and the first KDF, and wherein the processor is further configured to perform integrity protection on the second information to obtain the first MAC.

21. The communications apparatus of claim 20, wherein the first algorithm comprises the authenticated encryption algorithm, and wherein the processor is further configured to perform the integrity protection on the second information using the authenticated encryption algorithm to obtain the first MAC.

22. The communications apparatus of claim 20, wherein the first algorithm comprises the integrity protection algorithm, and wherein the processor is further configured to perform the integrity protection on the second information using the integrity protection algorithm to obtain the first MAC.

23. The communications apparatus of claim 17, wherein the first algorithm is supported by the communications apparatus and has a first highest priority in the one or more algorithms, and wherein the first KDF is supported by the communications apparatus and has a second highest priority in the one or more KDFs.

24. The communications apparatus of claim 17, wherein the fresh parameter comprises a value of a counter in a first node.

25. A communications apparatus comprising:
a memory configured to store instructions; and
a processor coupled to the memory and configured to:
send, to a first node, first algorithm negotiation request information indicating one or more algorithms and one or more key derivation functions (KDFs);
receive, from the first node, first information indicating a first algorithm in the one or more algorithms and a first KDF in the one or more KDFs, wherein the first information comprises a fresh parameter related to time validity of the first information;
obtain first verification information based on the first information, a preset shared key, the fresh parameter, and the first KDF; and
send the first verification information to the first node.

26. The communications apparatus of claim 25, wherein the one or more algorithms comprise an encryption algorithm, an integrity protection algorithm, or an authenticated encryption algorithm.

27. The communications apparatus of claim 26, wherein integrity protection is performed on the first information using the first algorithm.

28. The communications apparatus of claim 26, wherein the first information comprises second information and a first message authentication code (MAC), wherein the second information indicates the first algorithm and the first KDF, and wherein the first MAC is obtained by performing integrity protection on the second information.

29. The communications apparatus of claim 28, wherein the first algorithm comprises the integrity protection algorithm, wherein the first MAC is obtained by performing integrity protection on the second information using the integrity protection algorithm, wherein the processor is further configured to obtain a third MAC based on the integrity protection algorithm and the second information, and wherein the third MAC verifies integrity of the second information.

30. The communications apparatus of claim 28, wherein the first algorithm comprises the authenticated encryption algorithm, wherein the first MAC is obtained by performing integrity protection on the second information using the authenticated encryption algorithm, wherein the processor is further configured to obtain a third MAC based on the authenticated encryption algorithm and the second information, and wherein the third MAC is used to verify integrity of the second information.

31. The communications apparatus of claim 25, wherein the first algorithm is supported by the first node and has a first highest priority in the one or more algorithms, and wherein the first KDF is supported by the first node and has a second highest priority in the one or more KDFs.

32. The communications apparatus of claim 25, wherein the fresh parameter comprises a value of a counter in the first node.

* * * * *